(12) United States Patent
Gury et al.

(10) Patent No.: US 11,307,583 B2
(45) Date of Patent: Apr. 19, 2022

(54) DRONE WITH WIDE FRONTAL FIELD OF VIEW

(71) Applicant: PERFORMANCE DRONE WORKS LLC, Huntsville, AL (US)

(72) Inventors: Ryan Gury, Mount Vernon, NY (US); Florent Arnoux, Jersey City, NJ (US)

(73) Assignee: Performance Drone Works LLC, Huntsville, AL (US)

( * ) Notice: Subject to any disclaimer, the term of this patent is extended or adjusted under 35 U.S.C. 154(b) by 279 days.

(21) Appl. No.: 16/459,556

(22) Filed: Jul. 1, 2019

(65) Prior Publication Data

US 2021/0004003 A1 Jan. 7, 2021

(51) Int. Cl.
| | | |
|---|---|---|
| G05D 1/00 | (2006.01) | |
| G06T 7/593 | (2017.01) | |
| B64C 39/02 | (2006.01) | |
| G01S 17/933 | (2020.01) | |
| G06V 20/13 | (2022.01) | |

(52) U.S. Cl.
CPC ......... G05D 1/0088 (2013.01); B64C 39/024 (2013.01); G01S 17/933 (2013.01); G06T 7/596 (2017.01); G06V 20/13 (2022.01); *B64C 2201/127* (2013.01)

(58) Field of Classification Search
CPC .................................................. G05D 1/0088
See application file for complete search history.

(56) References Cited

U.S. PATENT DOCUMENTS

| | | | | |
|---|---|---|---|---|
| 9,734,583 B2* | 8/2017 | Walker | ................. | G06T 7/194 |
| 10,118,696 B1* | 11/2018 | Hoffberg | ................. | B64C 21/00 |
| 10,627,386 B2* | 4/2020 | Saez | ................. | G01N 33/02 |
| 10,899,471 B2* | 1/2021 | Liu | ................. | B64C 27/00 |
| 10,925,208 B2* | 2/2021 | Anderson | ................. | A01B 49/06 |
| 2010/0302359 A1* | 12/2010 | Adams | ................. | H04L 1/0017 375/240.01 |
| 2018/0003842 A1* | 1/2018 | Coates | ................. | G01V 1/364 |
| 2019/0259139 A1* | 8/2019 | Ichihashi | ................. | G06T 7/579 |
| 2019/0271767 A1* | 9/2019 | Keilaf | ................. | G01S 7/4816 |
| 2020/0108922 A1* | 4/2020 | Smith | ................. | B64C 39/024 |

(Continued)

FOREIGN PATENT DOCUMENTS

| | | | | | |
|---|---|---|---|---|---|
| EP | 3044091 A1 | * | 7/2016 | ............. | B64D 27/26 |
| EP | 3126067 B1 | * | 1/2020 | ............... | B08B 7/04 |

OTHER PUBLICATIONS

NPL, Huang, Chong, et al., ACT: An Autonomous Drone Cinematography System for Action Scenes, 2018 IEEE International Conference on Robotics and Automation (ICRA) (https://ieeexplore.ieee.org/stamp/stamp.jsp?tp=&arnumber=8460703) (hereinafter "Huang").*

(Continued)

*Primary Examiner* — Jean Paul Cass

(74) *Attorney, Agent, or Firm* — Vierra Magen Marcus LLP

(57) ABSTRACT

A drone includes a frame and a plurality of motors attached to the frame. Each motor of the plurality of motors is connected to a respective propeller located below the frame. A tail motor is attached to the frame. The tail motor is connected to a tail propeller located above the frame. Cameras are attached to the frame and located above the frame. The cameras have fields of view extending over the plurality of propellers.

15 Claims, 18 Drawing Sheets

(56) References Cited

U.S. PATENT DOCUMENTS

2020/0108924 A1* 4/2020 Smith ................ F41H 13/0087
2020/0284566 A1* 9/2020 Viviani .................... B64D 7/00

OTHER PUBLICATIONS

Burman, Prateek, Quadcopter stabilization with neural network, https://repositories.lib.utexas.edu/handle/2152/45875, University of Texas Thesis and Disseration )(2016)(Hereinafter "Burman").*
NPL, Kornatowski, P.M., et al., An Origami Inspired Cargo Drone, 2017 IEEE/RSJ International Conference on Intelligent Robots and Systems (IROS) Sep. 24-28, 2017, Vancouver, BC, Canada (https://ieeexplore.ieee.org/stamp/stamp.jsp?tp=&arnumber=8206607)(2017)(hereinafter "Kornatowski").*
Google Machine Translatio of EP3126067B1 to Pardell Apr. 3, 2014.*

* cited by examiner

US 11,307,583 B2

DRONE WITH WIDE FRONTAL FIELD OF VIEW

BACKGROUND

Radio controlled unmanned aircraft (e.g. drones, such as quadcopters) can move at high speed and make rapid changes in direction when remotely piloted by a skilled user. In drone racing, users race their respective drones around a course using remote-controls to maneuver around the course (e.g. through gates, around obstacles, etc.). A camera view from a drone may be relayed to a user to allow a First Person View (FPV) so that the user can see where the drone is going and steer it accordingly in the manner of a pilot sitting in the cockpit of an aircraft.

A drone may include a flight controller that provides output to motors and thus controls propeller speed to change thrust. For example, a quadcopter has four motors, each coupled to a corresponding propeller above the motor, with propellers mounted to generate thrust substantially in parallel (e.g. their axes of rotation may be substantially parallel). The flight controller may change speeds of the motors to change the orientation and velocity of the drone and the propellers may remain in a fixed orientation (i.e. without changing the angle of thrust with respect to the quadcopter) and may have fixed-pitch (i.e. propeller pitch may not be adjustable like a helicopter propeller so that each motor powers a corresponding fixed-pitch propeller in a fixed orientation with respect to a drone chassis). The flight controller may be directed by commands received from the user's remote-control and may generate outputs to motors to execute the commands.

DETAILED DESCRIPTION

The following presents a systems and methods associated with drones. In an example, a drone is formed as an asymmetric quadcopter with a triangular nose section that has three motors mounted underneath so that their propellers are below the motors (and below a frame or chassis). Motors are mounted at or near vertices of the triangle of the triangular portion. A tail motor is attached to a tail portion. The tail motor may be mounted on top of the frame with the propeller above the motor and frame (i.e. the opposite to the other three motors). Cameras located above the propellers (e.g. attached to an upper surface of the frame) look ahead over the propellers (not under them). In this configuration, when the drone flies nose-down, e.g. for high speed and/or acceleration, the cameras maintain a clear view ahead that is unobscured by the propellers. This configuration may be suitable for high speed drones such as racing drones, particularly drones that may benefit from accurate visual information about the pathway ahead (e.g. an autonomous racing drones that use computer vision components coupled to an AI controller to fly in races). One stereoscopic camera (including two cameras a distance apart) may be placed on either side of the drone (e.g. along leading edges of the triangular nose portion. Stereoscopic views of these cameras may overlap ahead of the drone so that there is detailed information about this area from different sources.

An AI controller may use Computer Vision (CV) based on multiple cameras (e.g. two, four or six cameras configured as one, two or three stereoscopic cameras) to pilot a drone based on visual input from the environment, determining the flightpath in real time rather than flying along a predetermined flightpath. A drone equipped with such an AI controller may be an autonomous drone that does not require human input to fly around a course (e.g. a race course). The AI controller may be coupled to other drone components (e.g. flight controller) through a connector so that the AI controller is removable from the drone, allowing the drone to be configured for remote-control (without the AI controller) and for autonomous flight (with the AI controller). The drone may also be switchable between autonomous and remote-control modes without physically removing the AI controller (e.g. a remote-control may send a command to change from autonomous mode to remote-control mode during flight).

Although the following description is primarily given the context of drones (e.g. quadcopters) moving along a three-dimensional flightpath through a course (e.g. a racecourse where drones compete to go around the racecourse and reach a finish line by selecting the fastest flightpath), certain concepts presented can be applied more generally. For example, the systems and techniques can be applied to non-drone aircraft or other objects that serve as a mobile source of the described signals as it moves along a three-dimensional path.

Figure 1:
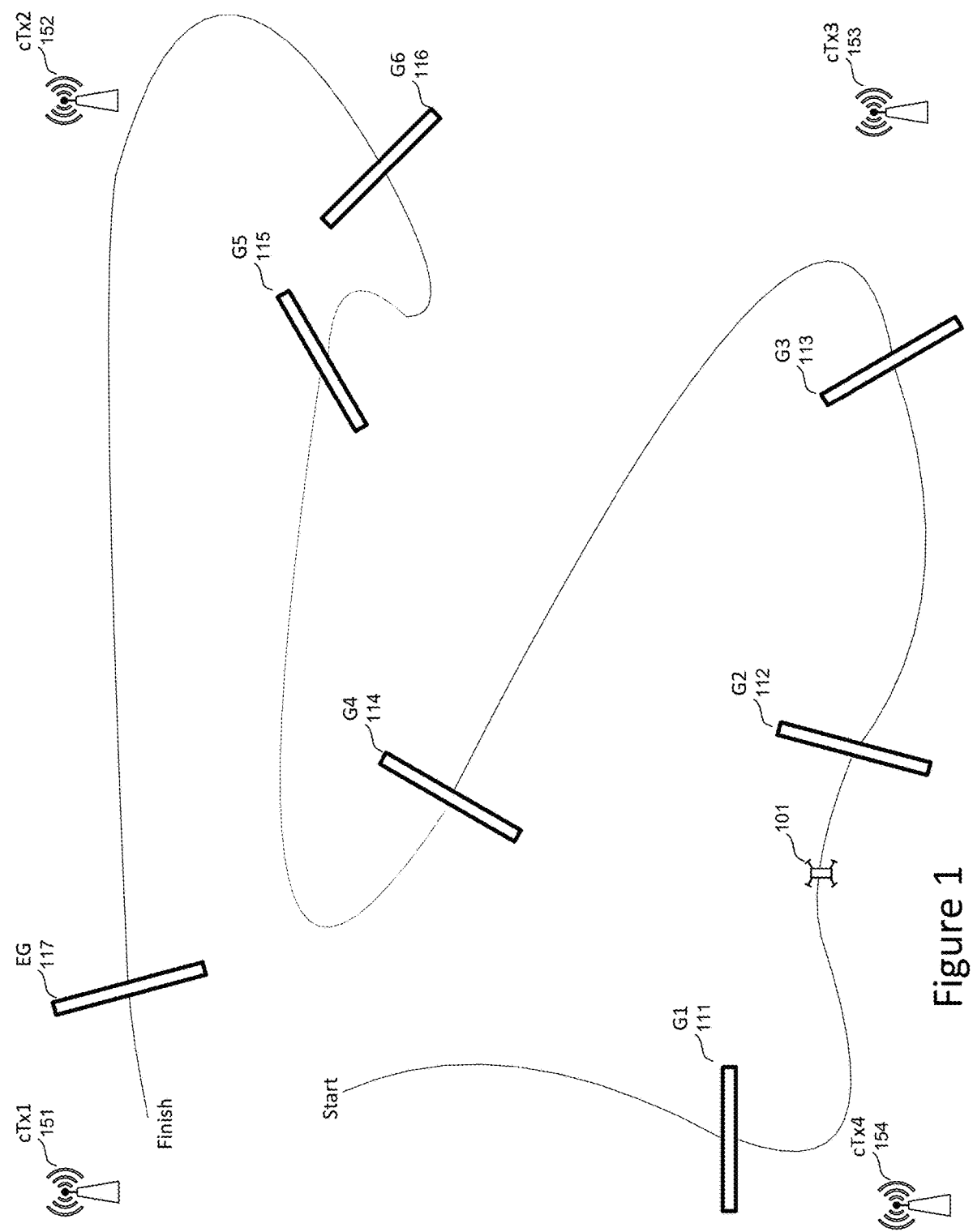
FIG. 1 is a top view of an example of a course and a drone moving along a path (flightpath) through the course.

FIG. 1 is a top view of an example of a course and a drone moving along a path through the course. From the start location, the course passes through the gates G1-G6 111-116 sequentially and then through an end gate EG 117 to arrive at the finish location. The drone 101 is shown moving along the path through the series of gates. A set of control transceivers cTx1-4 151-154 cover the region that includes the course to supply control signals to drones on the course and also receive data back from the drones so that users, using remote-controls, may fly their drones and may see video from a camera on their drone (FPV). Although the start and finish of the course shown FIG. 1A are shown as near each other, this need not be so in general. Similarly, although the course is shown defined by a series of frame-like gates, pylons or other structures can be used to specify a course or path. While drone racing provides one area in which the present technology may be used, the present technology is not limited to racing and may be used to operate a variety of drones and other autonomous craft in a variety of environments.

Figure 2:
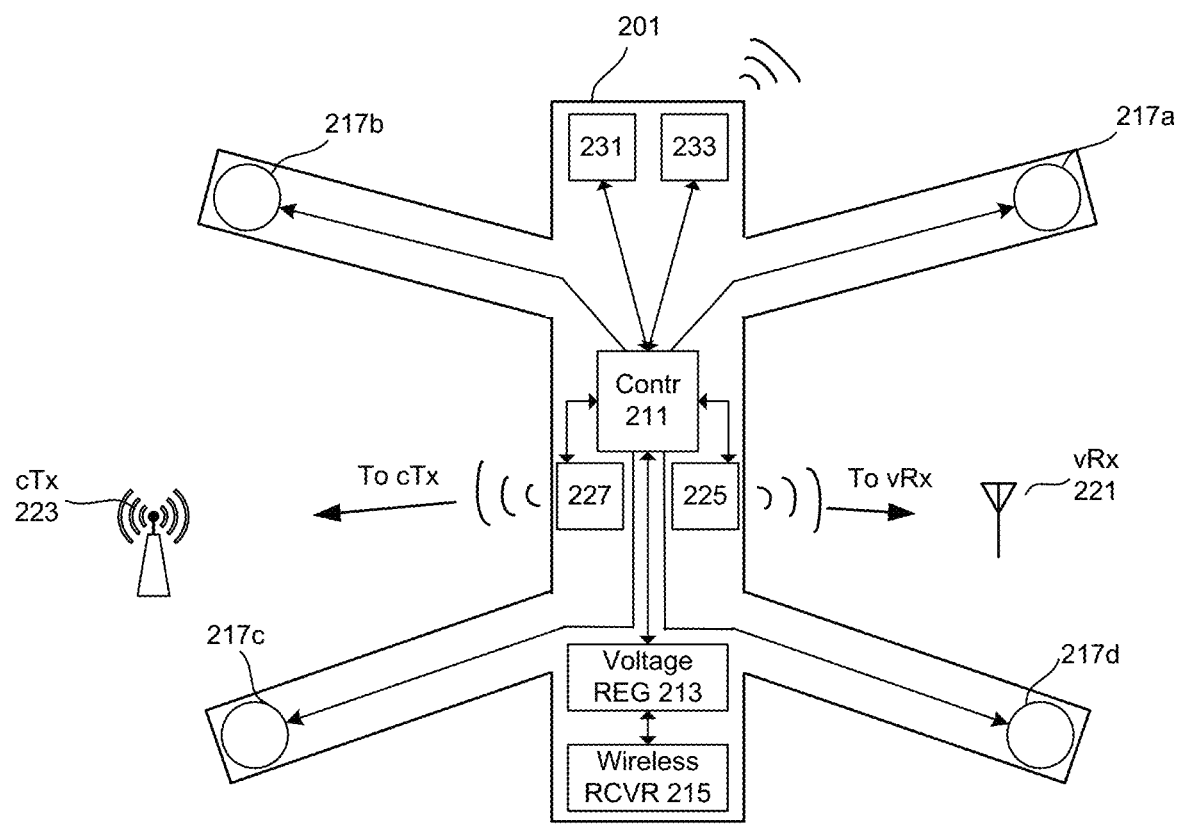
FIG. 2 is simplified representation of some of the components for one embodiment of a quadcopter.

FIG. 2 is simplified representation of some of the components for one example of a drone 201, which is a remote-controlled quadcopter in this example. FIG. 2 shows flight controller 211 connected to motors 217a-d (which turn respective propellers, not shown in this view), the voltage source and regulator 213, wireless receiver 215, video camera 231 and altitude sensor 233, and the transmitters 225 and 227. In this embodiment, extending on an arm from each of the corners of the drone is a motor 217a-d, each of which is controlled by the flight controller 211 to thereby control thrust generated by propellers attached to motors 217a-d. A voltage source (e.g. battery) and regulator 213 supplies power. A pilot's commands are transmitted from control signal transceivers such as cTx 223, received by wireless receiver 215. Control signal transceiver cTx 223 may be in a remote-control operated by a pilot (remote-control user) to fly drone 201 The flight controller 211 uses power from the voltage source 213 to drive the motors 217a-d according to the pilot's signals.

The drone also includes video camera 231 and altitude sensor 233 that supply data to the flight controller 211. An FM or other type video transmitter 225 transmits data from the video camera 231 to a video monitor receiver vRx 221 (external to the drone, such as on the ground) that monitors the video signals and passes on the video data to the pilot. Data can also be sent back to the control signal transceiver cTx 223 by the transmitter 227. Although the transmitter 227 and wireless receiver 215 are shown as separate elements in FIG. 2, in many embodiments these will be part of a single transceiver module (e.g. a remote-control may include both a control signal transceiver and a video monitor receiver to allow a remote-control user to see video from video camera 231 while piloting drone 201).

Figure 3A:
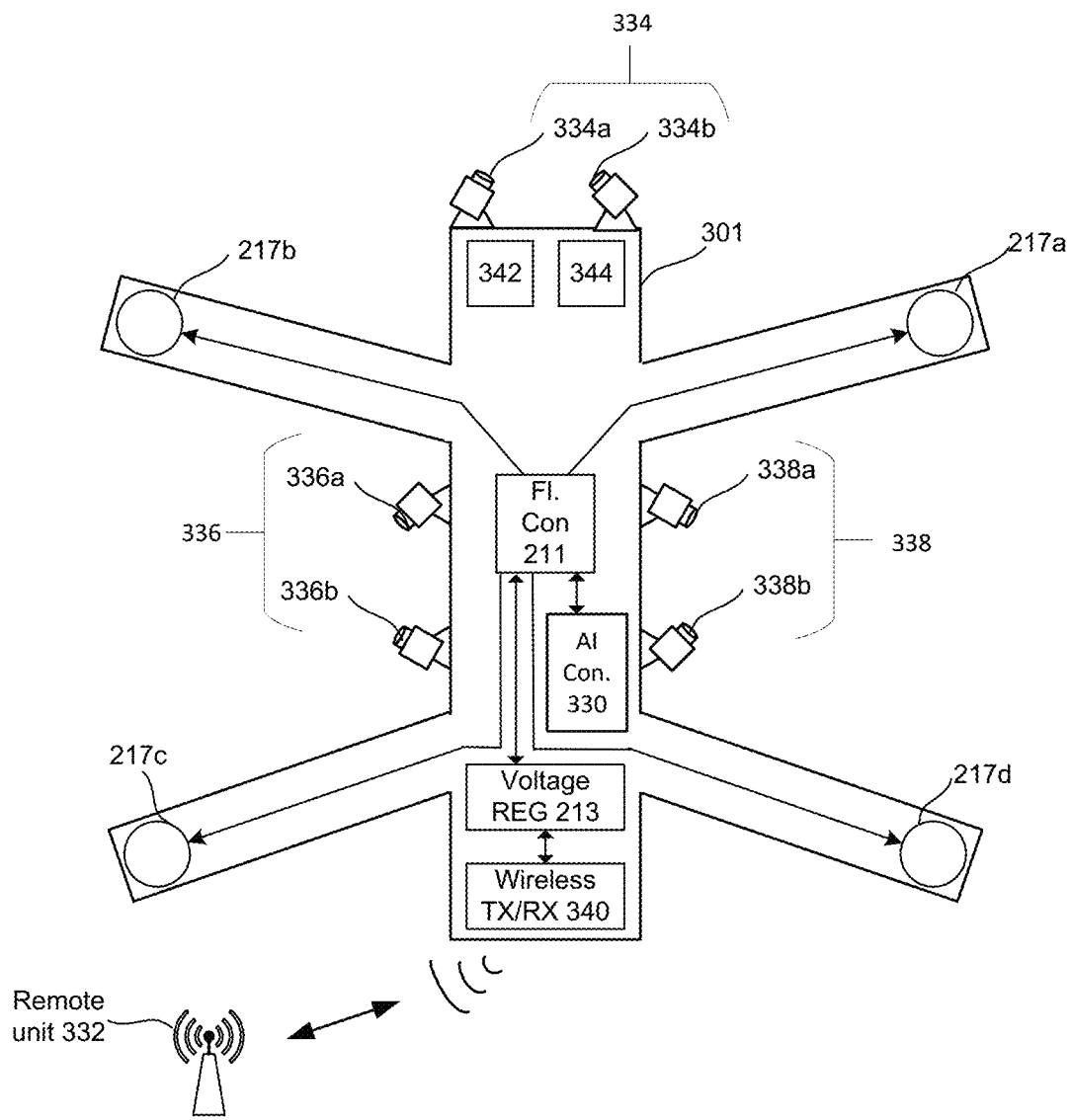
FIG. 3A shows an example of an autonomous quadcopter.

FIG. 3A shows an example of an autonomous drone 301 (autonomous quadcopter in this example), which is different to drone 201 in that it is configured for autonomous operation, instead of, or in addition to receiving commands from a remote user. For example, autonomous drone 301 may fly around a course such as illustrated in FIG. 1, maneuvering through gates, around obstacles, etc. without commands from a remote user. Instead of receiving commands via RF communication from a remote-control, when in autonomous mode, autonomous drone 301 may operate according to commands generated by an Artificial Intelligence (AI) controller 330, which is coupled to the flight controller 211 (components of autonomous drone 301 that are common to drone 201 are similarly labeled). In this arrangement, AI controller 330 selects a flightpath and generates commands according to the same command set used by a remote-control. Thus, remote unit 332 may send commands to flight controller 211 according to a predetermined command set when autonomous drone 301 is in a remote-control mode. AI controller 330 may send commands to flight controller 211 according to the same predetermined command set when autonomous drone 301 is in an autonomous mode. In this way, flight controller 211 may operate similarly in both remote-control mode and autonomous modes and does not require reconfiguration. This allows drones developed for remote-control to be easily adapted for autonomous operation, thus taking advantage of preexisting components and shortening development time for autonomous quadcopter development.

In an example, AI controller 330 may be implemented in an AI module that may be considered as a bolt-on component that may be added to a fully-functional drone (e.g. instead of, or in addition to a remote-control). For example, AI controller 330 may be implemented by a controller module, such as an NVIDIA Jetson AGX Xavier module, which includes a Central Processing Unit (CPU), Graphics Processing Unit (GPU), memory (e.g. volatile memory such as DRAM or SRAM), data storage (e.g. non-volatile data storage such as flash), and Vision accelerator. Other suitable controller hardware may also be used. The AI controller 330 may be connected to flight controller 211 and other quadcopter components through a physical connector to allow it to be connected/disconnected for configuration for AI control/remote-control. AI controller 330 may be physically attached to autonomous drone 301 by being clipped on, bolted on, or otherwise attached (e.g. to the chassis of drone 301) in a manner that makes physical removal easy.

While a human pilot may fly a drone based on video sent to the pilot from the drone, an AI pilot, such as embodied in AI controller 330 may pilot a drone based on different input including sensor input and/or input from multiple cameras (e.g. using Computer Vision (CV) to identify and locate features in its environment). While human pilots generally rely on a single camera to provide a single view (first person view, or "FPV"), an AI pilot may use a plurality of cameras that cover different areas (e.g. a wider field of view, more than 180 degrees and as much as 360 degrees). In an example, cameras may be arranged in pairs, with a pair of cameras having overlapping fields of view. This allows such a pair of cameras to form a stereoscopic camera so that depth of field information may be extracted by a CV unit. FIG. 3A illustrates an example of camera 334a and camera 334b, which are arranged with overlapping fields of view to form a stereoscopic camera 334. Similarly, cameras 336a and 336b form stereoscopic camera 336 and cameras 338a and 338b form stereoscopic camera 338. It will be understood that the orientations (different angles corresponding to different views) and locations of cameras shown in FIG. 3A are illustrative and that the number, location, arrangement, and pairing of such cameras may be varied according to requirements (e.g. more than three stereoscopic cameras may be used). In the example of FIG. 3A, video outputs of all cameras, 334a, 334b, 336a, 336b, 338a, and 338b (and any other cameras) are sent to AI controller 330. While one or more video output may be transmitted to an external location (e.g. transmitted by transmitter/receiver 340 to remote unit 332), in some cases no such transmission is performed when autonomous drone 301 is in autonomous mode. In some cases, an autonomous drone such as autonomous drone 301 is configurable to receive commands from a remote-control such as remote unit 332 (e.g. may be remote-controlled at certain times, e.g. according to selection by a remote user) through a communication circuit. These commands may use the same command set so that commands from AI controller 330 and remote unit 332 are interchangeable. Transmitter/receiver 340 may be considered an example of a Radio Frequency (RF) communication circuit coupled to the flight controller 211, the RF communication circuit (e.g. RF receiver) is configured to receive external commands from a remote-control (e.g. remote unit 332) and provide the external commands to the flight controller 211 to direct the flight controller to follow a remotely-selected flightpath, the external commands and the commands provided by the AI controller 330 from a common command set.

AI controller 330 includes computer vision (CV) capability to interpret input from cameras 334a, 334b, 336a, 336b, 338a, and 338b to gain information about the environment around drone 301 (e.g. object identification and location). Stereoscopic cameras 334, 336, 338 are configured to obtain different stereoscopic views to allow depth of field analysis so that the proximity of objects (including racecourse features such as gates, drones, and other racecourse features) may be accurately determined. AI controller 330 may use CV capability to generate a three-dimensional (3-D) picture of the surrounding of autonomous drone 301, or a portion of the surroundings (e.g. generally ahead of autonomous drone 301 along its direction of travel). In some cases, multiple cameras may be used to collectively provide a full 360-degree field of view. In other cases, cameras may cover less than 360 degrees but may still collectively cover a larger field of view than a human pilot could effectively monitor. Video output from cameras 334a, 334b, 336a, 336b, 338a, and 338b may be directly provided to AI controller 330 without conversion to RF and transmission as used by remote-controlled drones (e.g. remote-controlled quadcopters). This may allow rapid reaction as drone 301 moves and video output reflects changing surroundings (e.g. reduced latency may allow faster response than with remote-control).

AI controller 330 is coupled to the plurality of cameras 334a, 334b, 336a, 336b, 338a, and 338b to receive input from the plurality of cameras, determine a flightpath for the autonomous quadcopter (e.g. drone 301) according to the input from the plurality of cameras, and provide commands to the flight controller 211 to direct the flight controller 211 to follow the flightpath. Thus, the role of flight controller 211 is to execute commands from AI controller 330 (as it would from a remote-control user), while AI controller makes piloting decisions based on video input (and, in some cases, other input, e.g. from sensors). AI controller 330 may be considered an example of an Artificial Intelligence (AI) controller coupled to a plurality of cameras (e.g. cameras 334, 336, 338) to receive input from the plurality of cameras, determine a flightpath for the autonomous quadcopter 301 according to the input from the plurality of cameras, and provide commands to the flight controller 211 to direct the flight controller to follow the flightpath. Flight controller 211 is coupled to the four motors 217a-d to provide input to the four motors to control flight of the autonomous quadcopter 301.

In addition to cameras 334a, 334b, 336a, 336b, 338a, and 338b, autonomous drone 301 includes Inertial Measurement Unit (IMU) sensors 342 and rangefinder 344. IMU sensors 342 may measure one or more of specific force, angular rate, and magnetic field using a combination of accelerometers (acceleration sensors), gyroscopes (gyroscopic sensors), and magnetometers to generate motion data (e.g. autonomous quadcopter motion data). For example, IMU sensors 342 may be used as a gyroscope and accelerometer to obtain orientation and acceleration measurements. Rangefinder 344 (which may be considered a distance or range sensor) measures the distance from autonomous drone 301 to an external feature (e.g. the ground, obstacle or gate along a racecourse, etc.) Rangefinder 344 may use a laser to determine distance (e.g. pulsed laser, or Light Detection and Ranging "LiDAR"). Outputs from sensors 342 and 344 are provided to AI controller 330 in this example. Outputs from such sensors may also be provided to a flight controller (e.g. flight controller 211) in some cases. In addition to the sensors illustrated, an autonomous drone may include other sensors such as a barometer, or altimeter, to determine height of a drone above ground, and/or LIDAR sensors using lasers to generate 3-D representations of surroundings. In some cases, a Global Positioning System (GPS) module may be provided to provide position information based on communication with GPS satellites.

AI controller 330 may be in the form of a removable module that is added to a drone to provide capacity for autonomous operation. Within AI controller 330, certain modules may be provided with different functions. In an example, different AI technologies may be compared side-by-side by loading AI controllers with different AI code and flying drones using the different AI code (e.g. in a race) to compare AI technologies. In such an example, certain basic functions of AI controller 330 may be provided by standard modules that are common to multiple AI controllers while other functions may be customized by a particular module, or modules, that are then compared by flying drones with identical drone hardware, AI controller hardware, and some identical modules within AI controllers provide a comparison of AI technologies without effects of different hardware and/or software differences unrelated to AI piloting. According to an example, autonomous drone racing uses different AI technologies in identical autonomous drones. This eliminates hardware differences. Certain common software may be provided in standard AI controllers to provide a common platform (common hardware and software elements) that accommodates different AI technologies and allows them to compete on an equal footing. This provides development teams with an opportunity to focus on core technology, reduces cost, and reduces development time. Racing drones around complex courses provides comparison between different candidate AI technologies and can identify winning candidates for further development. This provides valuable information, reduces wasted resources on unpromising technologies, and rapid identification of winning technologies reduces overall development time and cost. Examples of autonomous drones, including autonomous quadcopters are described in U.S. patent application Ser. No. 16/360,999, filed on Mar. 21, 2019, which is hereby incorporated by reference in its entirety.

In order for computer vision cameras to provide accurate real-time input for autonomous flight, the cameras generally need to have a clear view of objects around a drone, particularly ahead of the drone, so that the drone does not collide with any object. In some cases, the field of view of one or more cameras may be obscured by one or more propellers, which may be detrimental in one or more ways, e.g. visual information may be reduced, computer vision may be impaired, and/or autonomous flight control may be impacted.

Figure 3B:
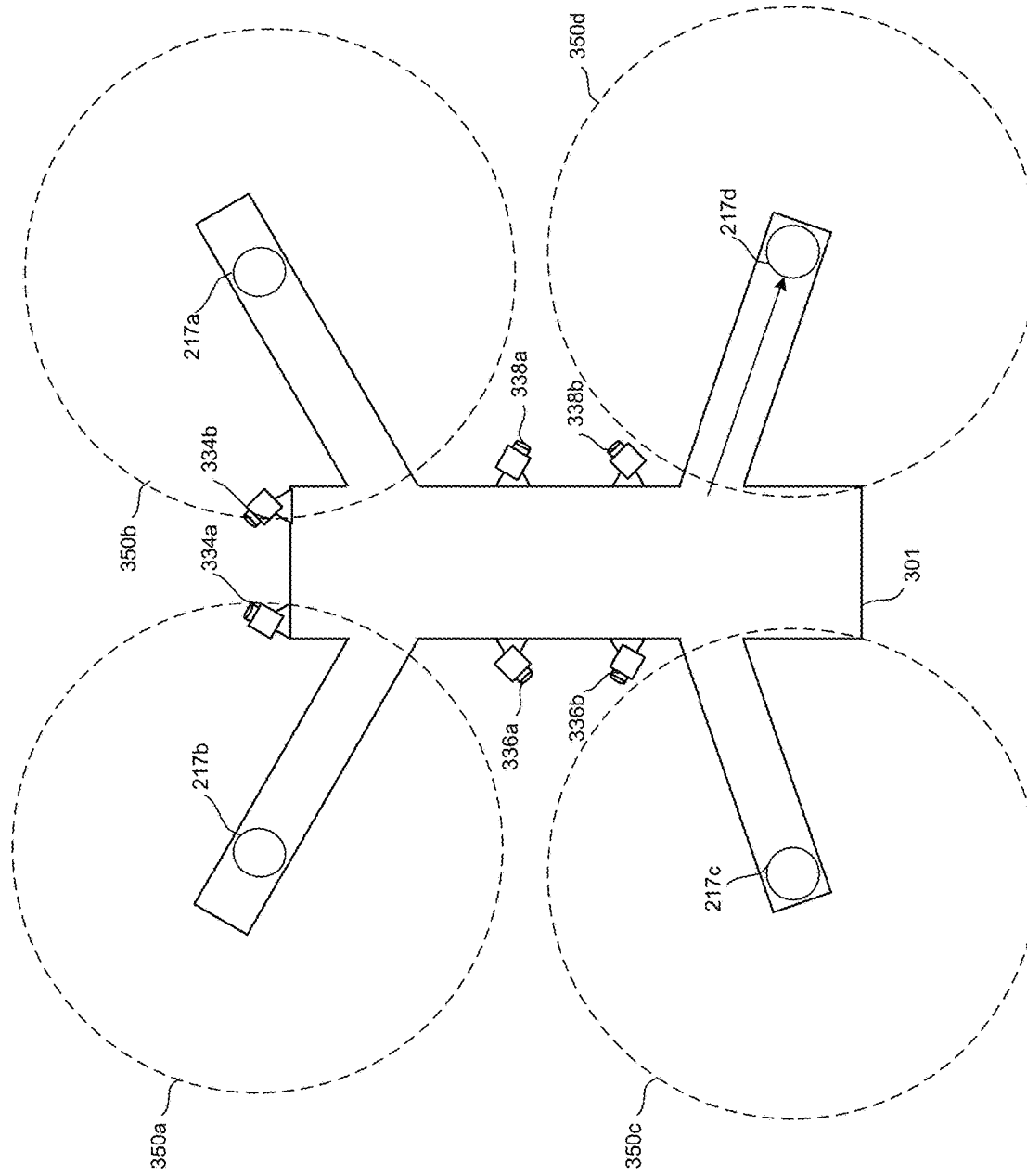
FIG. 3B shows an example of an autonomous quadcopter with propellers.

FIG. 3B shows an example arrangement of propellers of quadcopter 301 in a top-down perspective. Propellers 350a-d are shown by circles (outlined by dashed lines) that indicate the areas swept by the propellers. Where propellers 350a-d are mounted above the frame of quadcopter 301, the propellers may obscure upper portions of the fields of view of one or more camera, which may have an impact on autonomous flight, particularly high-speed flight such as during a drone race.

Figure 4A:
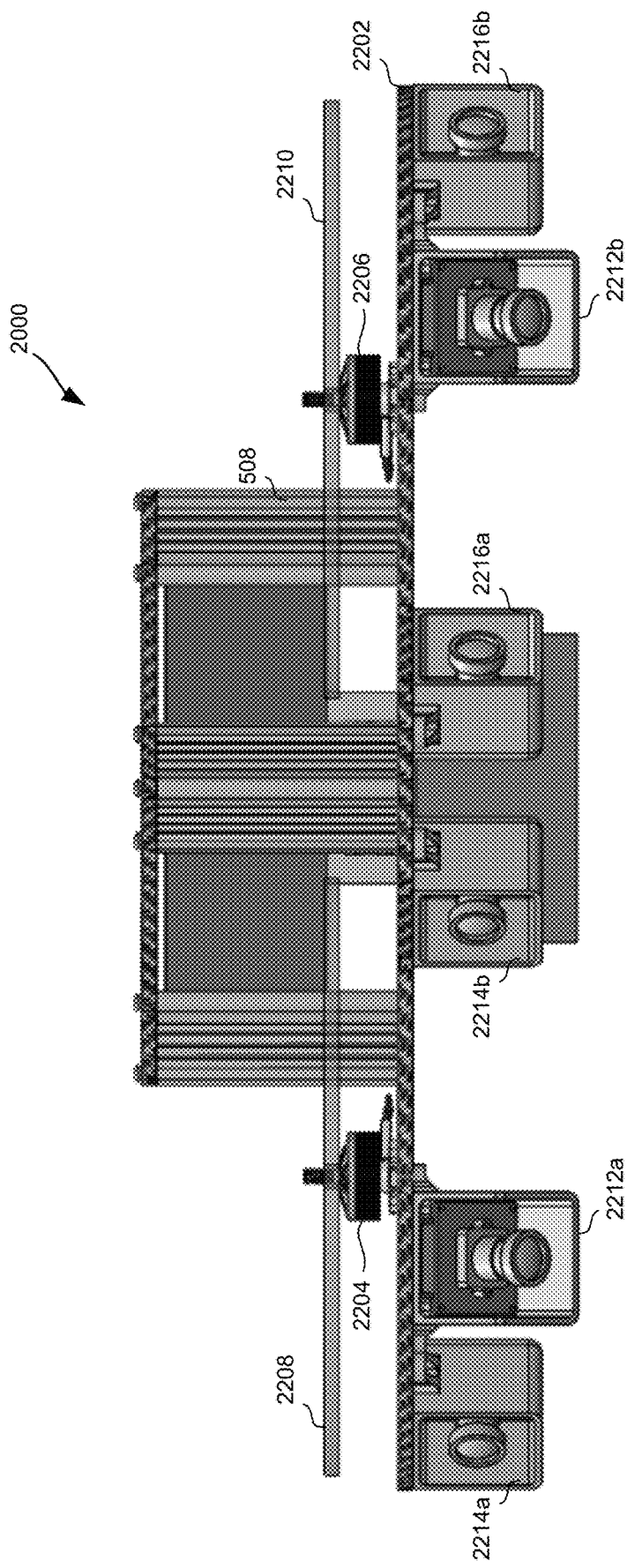
FIG. 4A-B show another example of an autonomous quadcopter.
Figure 4B:
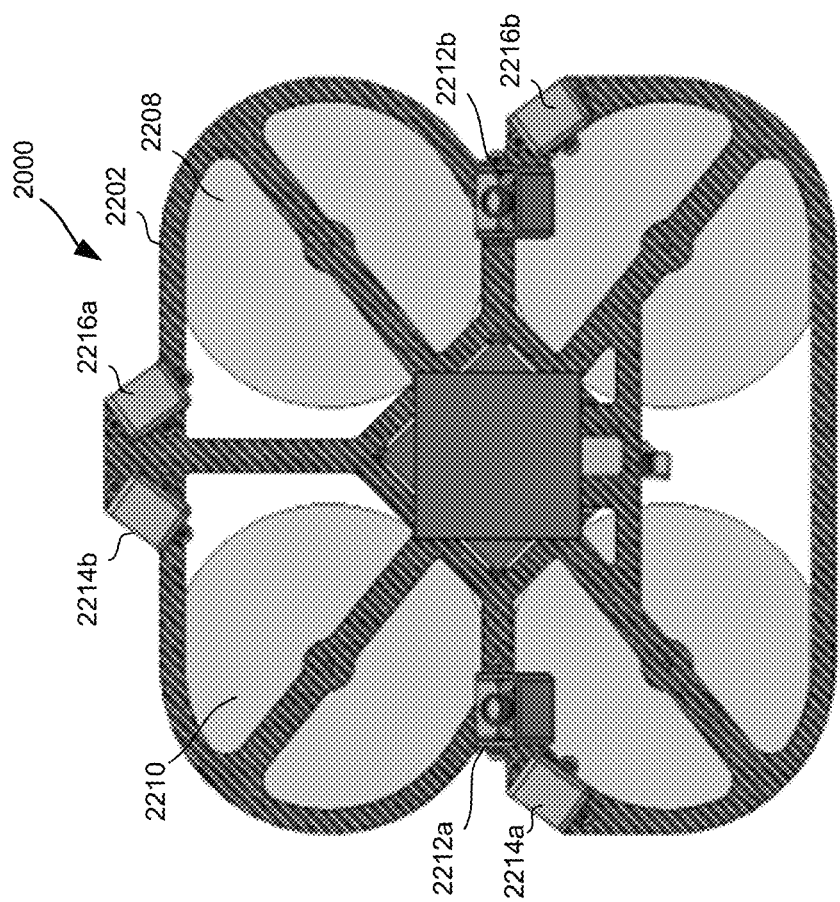

FIG. 4A shows autonomous drone 2000 from the front with an AI controller 508 mounted on top of a frame 2202 (chassis) that extends along a horizontal plane. Motors 2204, 2206 and corresponding propellers 2208, 2210 are mounted on top of frame 2202 (e.g. attached to an upper surface of frame 2202) so that propellers are above the plane of frame 2202. Propellers spin in a plane that is parallel to (or substantially parallel to) the plane of frame 2202 (i.e. axes of motors 2204, 2206 are perpendicular, or substantially perpendicular, to frame 2202). Motors 2204, 2206 correspond to two of four motors 2014 of drone 2000 (the other two motors are not visible in this view and are shown in FIG. 4B). All such motors may be mounted in a fixed manner so that their direction of thrust is always perpendicular to the plane of frame 2202 (downwards in FIG. 4A).

Six cameras are mounted on the bottom of frame 2202 (attached to a lower surface of frame 2202). Cameras are arranged in pairs to form stereoscopic cameras. Thus, cameras 2212a and 2212b form a first stereoscopic camera looking down and forward of autonomous quadcopter 2000. Cameras 2214a and 2214b form a second stereoscopic camera looking forward and to the right of autonomous quadcopter 2000 (to the left in the view of FIG. 22A). Cameras 2216a and 2216b form a third stereoscopic camera looking forward and to the left of autonomous quadcopter 2000 (to the right in the view of FIG. 22A).

FIG. 4B shows a bottom-up view of autonomous drone 2000 including cameras 2212a, 2212b, 2214a, 2214b, 2216a, 2216b mounted to the underside of frame 2202. In this example, the fields of view of cameras 2212a, 2212b may be limited by propellers 2210 and 2208 and their respective propeller guards (portions of frame 2202 that extend to protect propellers. For example, cameras 2212a, 2212b may be unable to see effectively above the plane of frame 2202. Even without a propeller guard, the propellers may cause significant obscuring of a camera's view so that simply removing propeller guards may not be an ideal solution.

Figure 5A:
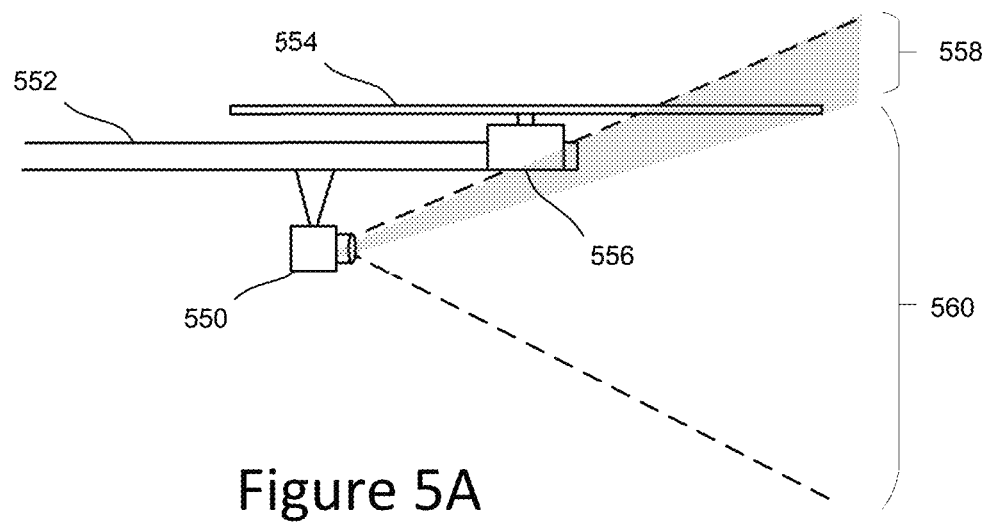
FIGS. 5A-B illustrate cameras obscured by overhanging propellers.

FIG. 5A shows a first example of a camera 550 attached to a lower surface of drone frame 552. Propeller 554 is coupled to motor 556 and is located above frame 552. In this configuration, the field of view of camera 550 is obscured. A portion of frame 552 and motor 556 extend into the field of view and may completely obscure a portion of the field of view. A portion of propeller 554 also obscures (at least partially) a portion of the field of view as it spins so that the field of view includes an obscured portion 558 (shaded) and an unobscured portion 560. Addition of a propeller guard (e.g. by extending frame 552) would generally increase the size of obscured portion 558 and/or change a partially obscured area to a fully obscured area.

Cameras may be attached at different locations to improve their field of view. For example, a camera may be located at the edge of a frame as shown in FIG. 4B. However, in some cases, a frame may not extend beyond a propeller (e.g. where no propeller guard is provided as illustrated in FIG. 5A) so that even locating a camera at the edge of a frame results in an obscured field of view.

Figure 5B:
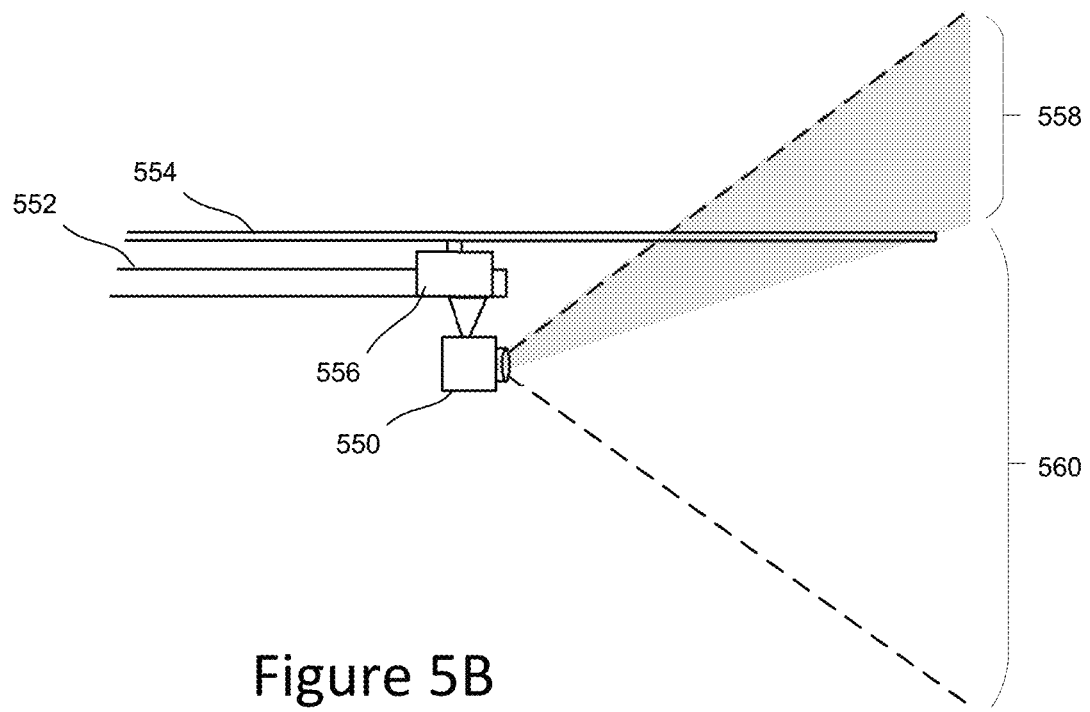

FIG. 5B illustrates another example of locating camera 550 with respect to frame 552. In this example, camera 550 is located along an edge of frame 552, under motor 556. In this arrangement, camera 550 may have a field of view that extends higher (i.e. above the plane of frame 552. However, even in this configuration, propeller 554 obscures the field of view of camera 550 so that the field of view includes obscured portion 558 and unobscured portion 560.

While the illustrations of FIGS. 5A and 5B show a drone in a horizontal orientation, with the plane of frame 552 extending horizontally and the plane of rotation of propeller 554 extending horizontally (e.g. parallel to the ground), drones do not always fly in this orientation. While drones may move vertically (e.g. take-off and landing) in a horizontal orientation, orientation may deviate from horizontal during flight. Where propeller pitch is fixed and propeller orientation with respect to a frame is fixed (as in the case of many drones), lateral movement may be achieved by controlling power to different propellers to change the angle of the drone so that some of the thrust from the propellers is used for forward motion. To describe changing orientation, the terms pitch, roll, and yaw, which are common in the aircraft sector, may be used for a drone.

Figure 6:
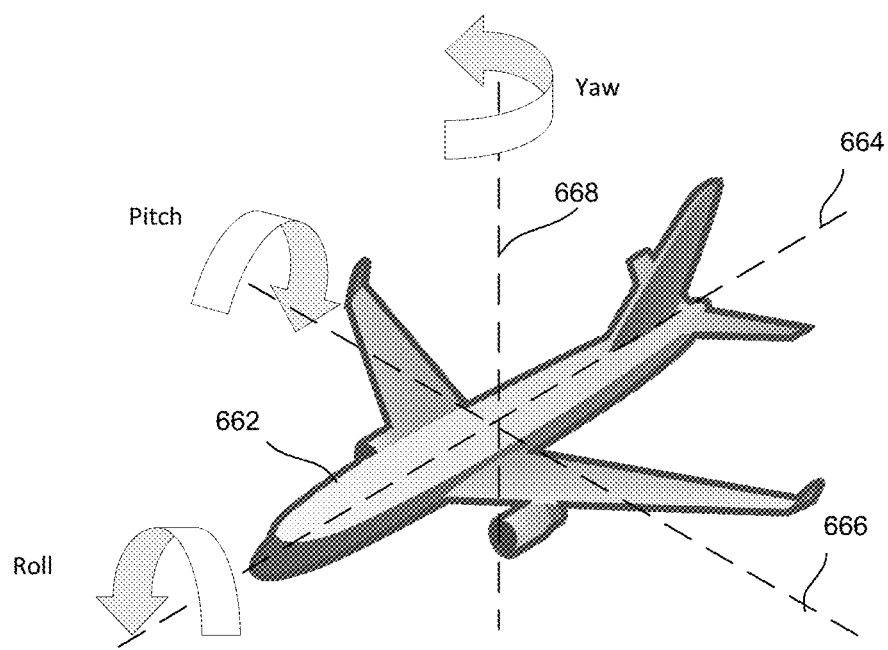
FIG. 6 illustrates orientation of an aircraft.

FIG. 6 illustrated pitch, roll, and yaw of an aircraft 662 that has a centerline 664 (roll axis) extending from the nose to the tail (through the fuselage). Rotation of aircraft 662 about centerline 664 may be referred to as roll. Orthogonal to centerline 664 is pitch axis 666 (extending through and parallel to the wings of aircraft 662 in this example. Rotation about pitch axis 666 may be referred to as pitch. Orthogonal to centerline 664 and pitch axis 666 is yaw axis 668. Rotation about yaw axis 668.

While a conventional aircraft such as aircraft 662 may be symmetric along a plane of the centerline and yaw axis (i.e. from side to side), conventional aircraft are generally asymmetric along a plane of the pitch axis and yaw axis (i.e. from nose to tail) so that they are designed to generally travel with a predetermined orientation with respect to their course. The leading part of such an aircraft may be referred to as the "nose" while the trailing part may be referred to as the "tail." Such aircraft generally fly nose-first with the centerline substantially aligned with the course (with some deviation especially during turns, take-offs, landings, turns, and other maneuvers). Thus, changing course may include rotating about the yaw axis to realign the aircraft with a new course. In contrast some drones (e.g. quadcopters) are symmetric about a plane of the pitch and yaw axes so that nose and tail portions may be substantially identical. Such a drone may be able to change course without rotating about the yaw axis. To facilitate autonomous flight, cameras may be positioned and oriented to view the environment around a drone. This may be particularly important along the direction of travel. Thus, for a drone that is asymmetric and has a defined nose and tail, it may be sufficient to have cameras directed in the direction of travel to see ahead. For a drone that can change course without yaw (and thus does not have a defined nose or tail) it may be necessary to have cameras that provide full 360-degree coverage so that the drone does not fly blind in any orientation. In either case, any obscuring of a camera's field of view by propellers may be significant. Aspects of the present technology are applicable to symmetric and asymmetric drones including autonomous quadcopters and other drones that include cameras.

Figure 7:
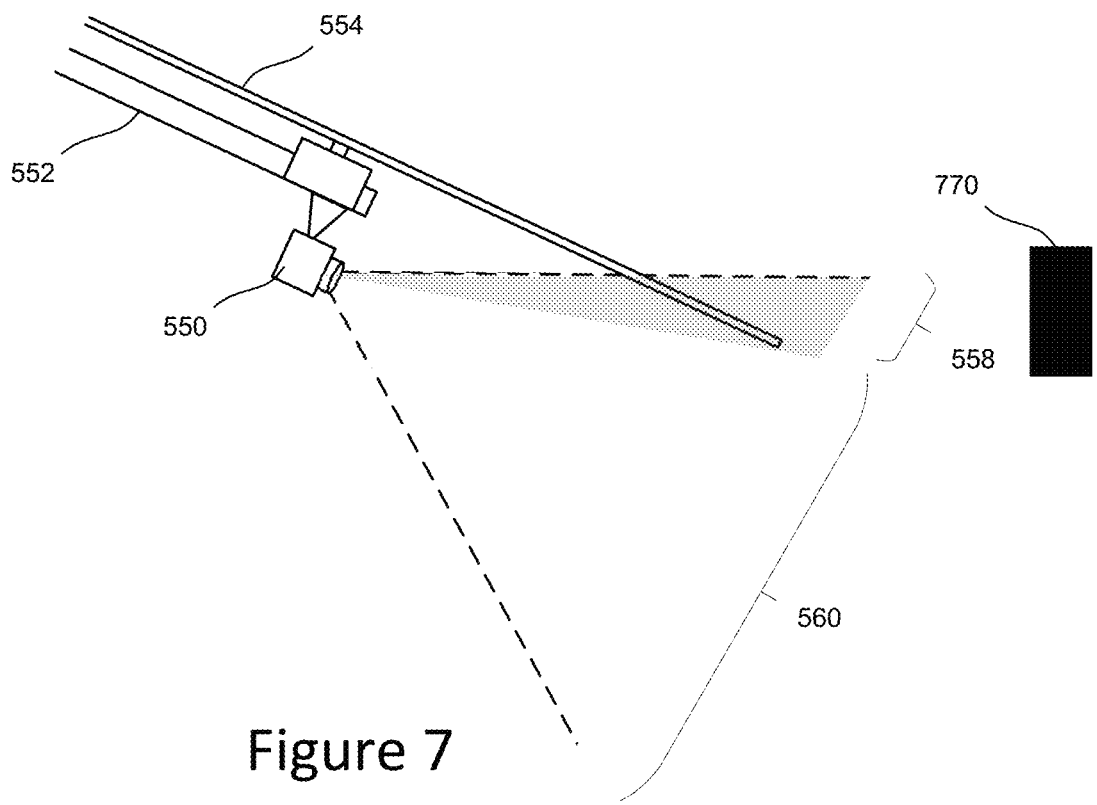
FIG. 7 illustrates a camera obscured by a propeller in flight.

FIG. 7 illustrates an example of a portion of a drone during flight, with the drone flying from left to right in this view (i.e. with negative pitch, or nose-down, such that propeller 554 directs thrust down and to the left to propel the drone to the right). It can be seen that, in this orientation, obscured portion 558 (obscured by propeller 554) extends ahead of the drone so that an object 770 that is located in the path of the drone may lie in obscured portion 558 as shown, which may lead to a collision. In general, greater acceleration and speed may involve greater pitch (negative pitch, or nose-down orientation). For high-performance drones in a crowded environment (e.g. racing drones in a racecourse with obstacles, gates, other drones, etc.) that depend on computer vision (e.g. CV-based autonomous flight) such obscured fields of vision may impact autonomous flight and may cause collisions between drones and/or with external objects. Although drones may fly in different orientations, descriptions of component configurations of a drone are generally given in terms of a drone that is at rest and level, e.g. on a landing surface with the plane of a frame and the planes of propeller rotation substantially horizontal, parallel to the ground or landing surface.

Figure 8A:
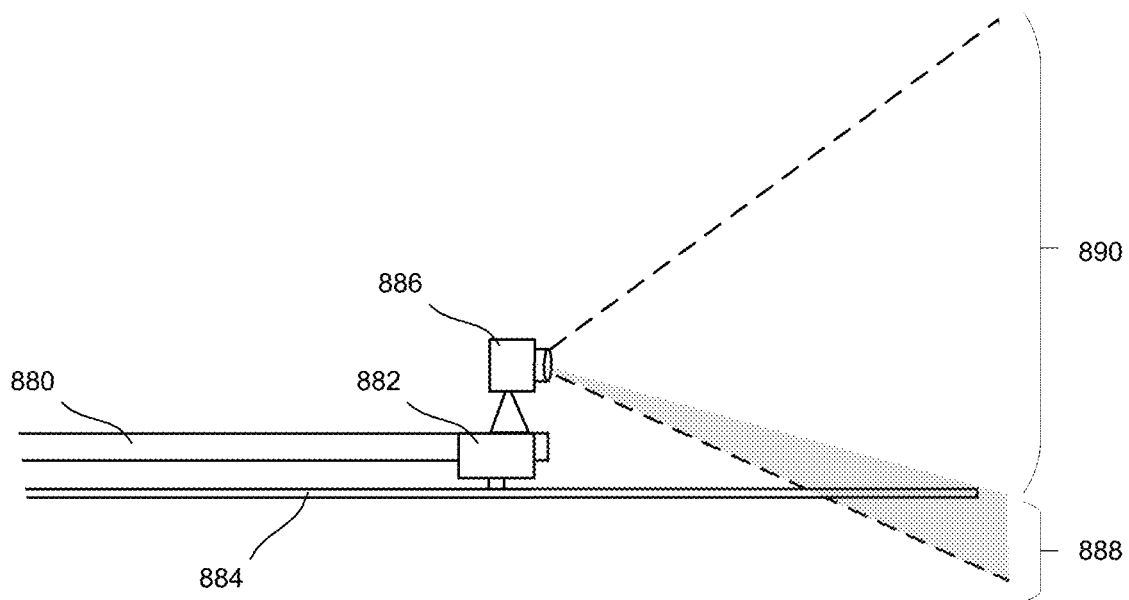
FIGS. 8A-B illustrate an example of a camera located above a propeller.

FIG. 8A shows an example of a portion of a drone that includes a portion of a frame 880 that extends along a plane (horizontally in the example of FIG. 8A), with a motor 882 attached to frame 880 and coupled to propeller 884, which is located below motor 882 and frame 880 (i.e. below the horizontal plane of frame 880 shown). Camera 886 is located above frame 880 (i.e. above the horizontal plane of frame 880 shown). Camera 886 may be attached to an upper surface of frame 880 using a mounting. Thus, the arrangement of components is generally inverted or flipped from that shown in FIGS. 5A-B with propeller 884 below frame 880 and camera 886 above frame 880. As illustrated, propeller 884 extends into the field of view of camera 886 thus creating an obscured portion 888 of the field of view of camera 886. Obscured portion 888 is along the lower end of the field of view (i.e. looking at a downward angle) while an unobscured portion 890 extends laterally and upwards (the opposite of obscured portion 558 in FIG. 5A).

Figure 8B:
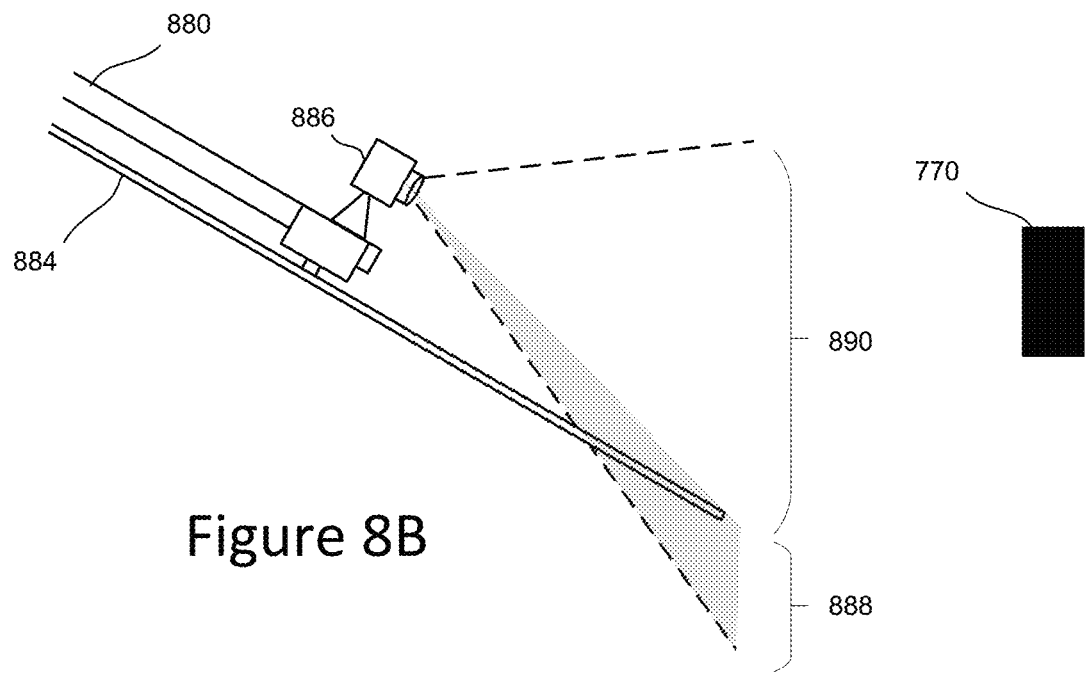

The benefits of the configuration of FIG. 8A may be seen in FIG. 8B, which shows the same portion of a drone in flight and shows the field of view of camera 886 (with camera 886 looking in the direction of travel, which is from left to right in FIG. 8B). In this orientation, unobscured portion 890 extends ahead horizontally and includes an angular range above and below the horizontal. Thus, object 770, which lies in the path of the drone lies in unobscured portion 890 and not in obscured portion 888 so that it can be clearly seen by camera 886 and the AI controller can take appropriate action to avoid collision. Whereas in FIG. 7, negative pitch caused obscured portion 558 to align with the horizontal path of the drone, in FIG. 8B negative pitch causes the obscured portion to angle down from the horizontal path of the drone and generally moves it out of the way. Thus, while camera views along the path of travel become increasingly obscured with negative pitch (and thus generally with acceleration and speed) in FIG. 7, camera views along the path of travel become less obscured with negative pitch in FIG. 8B. This facilitates high acceleration and high speed in autonomous drones.

While the configuration of FIGS. 8A-B may be implemented in a wide variety of drones, some configurations may facilitate implementation of this configuration in an efficient way. For example, in an asymmetric drone, which has defined nose and tail portions, the configuration of FIGS. 8A-B, with propeller(s) below camera(s), may be used at or near the nose of the drone while other portions of the drone (e.g. at or near the tail) may have a different configuration (e.g. with propeller(s) above a frame and/or camera(s)). This provides the advantages of improved frontal field of view while using a different configuration at the rear where the field of view may be less important (and where, in some cases, no cameras may be located).

Figure 9:
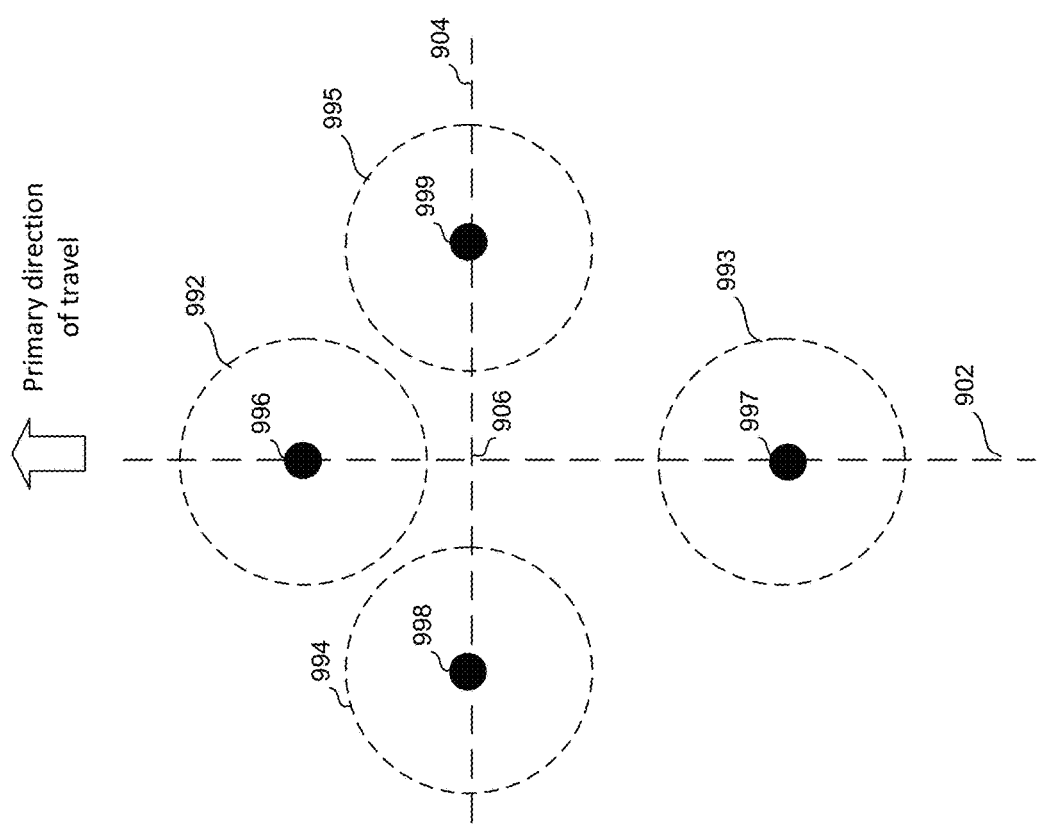
FIG. 9 illustrates an example of asymmetric motor and propeller locations for a quadcopter.

FIG. 9 shows an asymmetric arrangement of propellers according to one example. FIG. 9 shows a top-down view of the propellers with the primary direction of travel up the page as shown by the arrow. In this example, four propellers 992-995 and their respective motors 996-999 are provided in an asymmetric arrangement. Nose motor 996 (and axis of nose propeller 992) are along centerline 902. Tail motor 997 (and axis of tail propeller 993) are also along centerline 902. Left-side motor 998 and right-side motor 999 (and their respective propellers 994, 995) are located equidistant from centerline 902 along a line 904, which extends perpendicular to centerline 902 and which may form the pitch axis of the drone. It can be seen that left-side motor 998 and right-side motor 999 are closer to nose motor 996 than to tail motor 997 (i.e. intersection point 906 of centerline 902 and line 904 is not equidistant between nose motor 996 and tail motor 997 but instead is closer to nose motor 996. The locations of propellers 992-995 (e.g. above or below motors 996-999) may be selected based on various factors including camera fields of view. For example, nose propeller 992, left-side propeller 994, and right-side propeller 995 may be located below nose motor 996, left-side motor 998, and right-side motor 999 respectively (and may be located below a frame) to provide an unobstructed field of view along the primary direction of travel for cameras that may be mounted above propellers 992, 994, 995. Tail propeller 993 may be located above tail motor 997 (and may be located above a frame). In some cases, this location of tail propeller 993 causes little or no impairment of any camera field of view (e.g. there may not be any camera over tail propeller 993 and/or facing in the opposite direction to the primary direction of travel).

Figure 10:
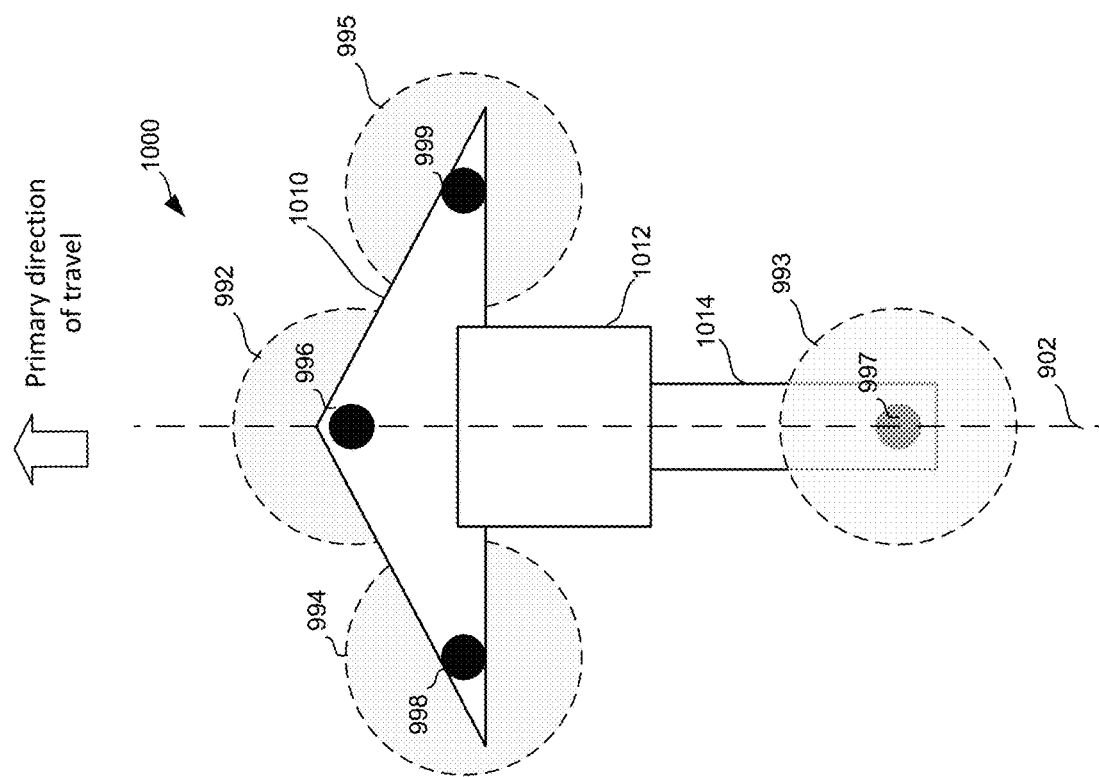
FIG. 10 shows an example of a drone with an asymmetric frame that is suitable for implementing the configuration of FIG. 9.

The arrangement of motors and respective propellers illustrated in FIG. 9 may be implemented using various drone structures (e.g. different frame or chassis). FIG. 10 shows one example of a drone 1000 that includes motors 996-999 (and respective propellers 992-995) in the configuration shown in FIG. 9. Drone 1000 is a quadcopter that includes motors 996-999 attached to an asymmetric frame that includes a triangular portion 1010, a central portion 1012, and a tail portion 1014. Nose portion 1010 is triangular in shape with an obtuse angle (e.g. 120 degrees) where nose motor 996 is located (i.e. obtuse angle at the leading corner of nose portion) and has acute angles on the left side where left-side motor 998 is located and on the right side where right-side motor 999 is located (i.e. motors are attached at respective corners of triangular portion 1010). Other configurations may also be used. Motors 996, 998, 999 may be mounted to triangular portion 1010 in any suitable manner, e.g. attached to a surface, such as a lower surface of triangular portion 1010. Propellers 992, 994, 995 are located below motors 996, 998, 999 respectively and below triangular portion 1010. This may allow cameras mounted above propellers 992, 994, 995 to have fields of view that extend over propellers 992, 994, 995 so that they are not obscured as drone 1000 moves (e.g. as shown in FIG. 8B).

In contrast with propellers 992, 994, 995, tail propeller 993 is located above tail motor 997 and above tail portion 1014. Thus, in this arrangement, three of four propellers are located below respective motors and below the frame, while one propeller is located above its respective motor and above the frame. In other examples, different numbers of propellers may be arranged in various ways (e.g. more than four propellers in total, more than three propellers located below respective motors and/or more than two propellers located above respective motors and frame). Tail portion 1014 may be of any suitable length so that the location of tail motor 997 with respect to other motors 996, 998, 999 may be configured as required.

Central portion 1012 may be used for mounting components such as a battery; electronic circuits including, for example, communication circuits, an AI controller, CV circuits, motor control circuits, sensors, power control circuits, and/or other circuits. In some cases, such components may be mounted to triangular portion 1010 and/or tail portion 1014 so that central portion 1012 may not be required (e.g. tail portion 1014 may be directly joined with triangular portion 1010). In some examples, a frame may be formed of a single piece of material so that triangular portion 1010, central portion 1012, and tail portion 1014 may be portions of a common piece of material, e.g. a strong, light-weight material such as carbon fiber.

Figure 11:
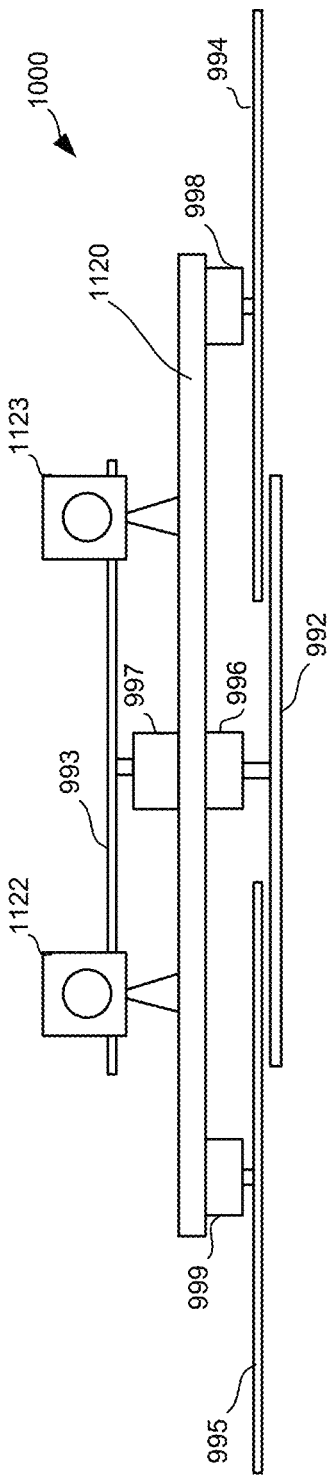
FIG. 11 shows a front-on view of cameras mounted on the drone of FIG. 10.

FIG. 11 shows drone 1000 looking along centerline 902 from ahead of drone 1000 along the primary direction of travel (i.e. primary direction of travel is out of the page in this view). Frame 1120 (which includes triangular portion 1010, central portion 1012 and tail portion 1014) is shown as a single element in this view because triangular portion 1010, central portion 1012 and tail portion 1014 are not separately visible. Frame 1120 is formed of a single piece of material extending along a plane (horizontal plane in this perspective). Motors 996, 998, 999 are mounted to the lower surface of frame 1120 so that respective propellers 992, 994, 995 are located below motors 996, 998, 999 and below frame 1120. Tail motor 997 is mounted on an upper surface of frame 1120 with tail propeller 993 located above tail motor 997 and above frame 1120. FIG. 11 also shows cameras 1122, 1123 mounted on the upper surface of frame 1120. For example, cameras 1122, 1123 may have overlapping fields of view and may form a stereoscopic camera that is used for camera vision that allows an AI controller to fly drone 1000 with little or no human intervention.

Figure 12:
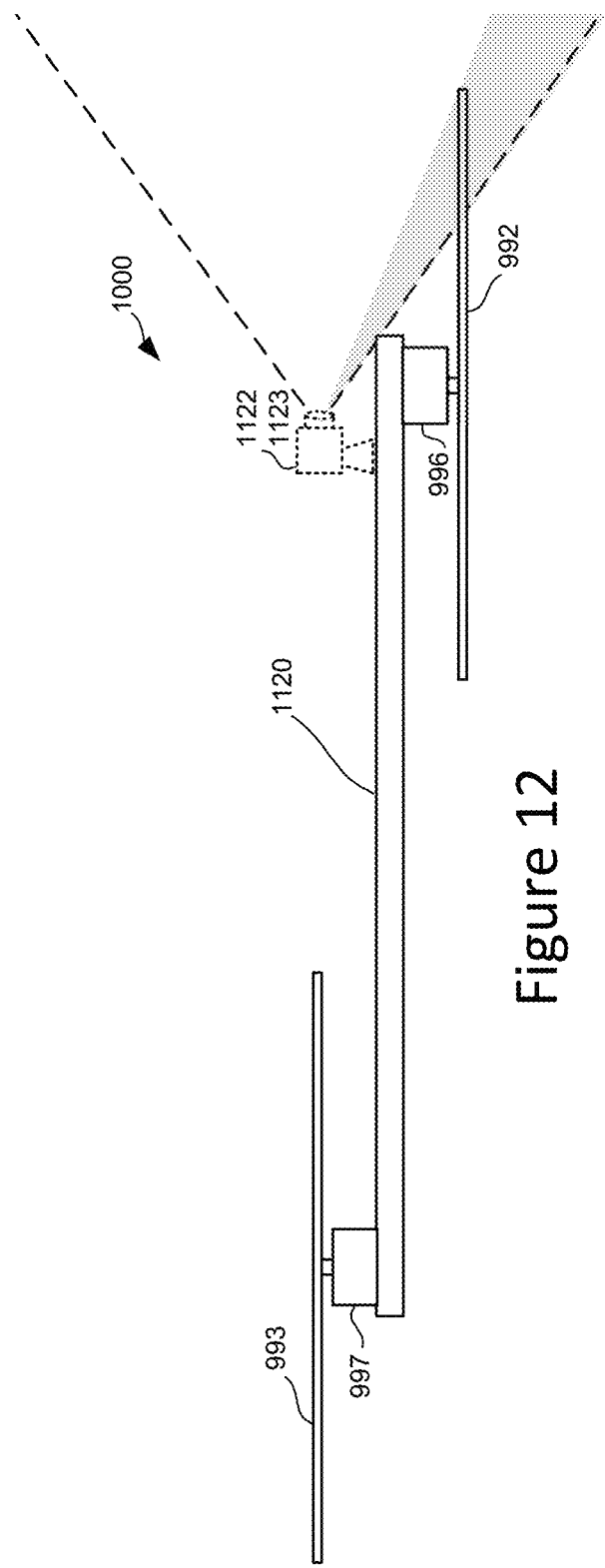
FIG. 12 shows a cross sectional view of the drone of FIGS. 10-11.

FIG. 12 illustrates drone 1000 in cross section along centerline 902 including nose motor 996, tail motor 997, and respective propellers 992, 993 attached to frame 1120. Cameras 1122, 1123 are shown in outline (these are not along centerline 902 and thus not in a cross section through centerline 902) to show their fields of view extending ahead of drone 1000 along the primary direction of travel (from left to right in this perspective). Because cameras 1122, 1123 are located above nose propeller 992 (and above propellers 994, 995) their fields of view are relatively unobstructed as drone 1000 moves forward with negative pitch (i.e. with its nose down and tail raised). Thus, the configuration of drone 1000 generally provides good visibility along the primary direction of travel so that cameras used for automated flight can clearly see ahead and thus provide accurate visual data to a CV system, which may then be used by an AI controller to fly drone 1000.

Figure 13A:
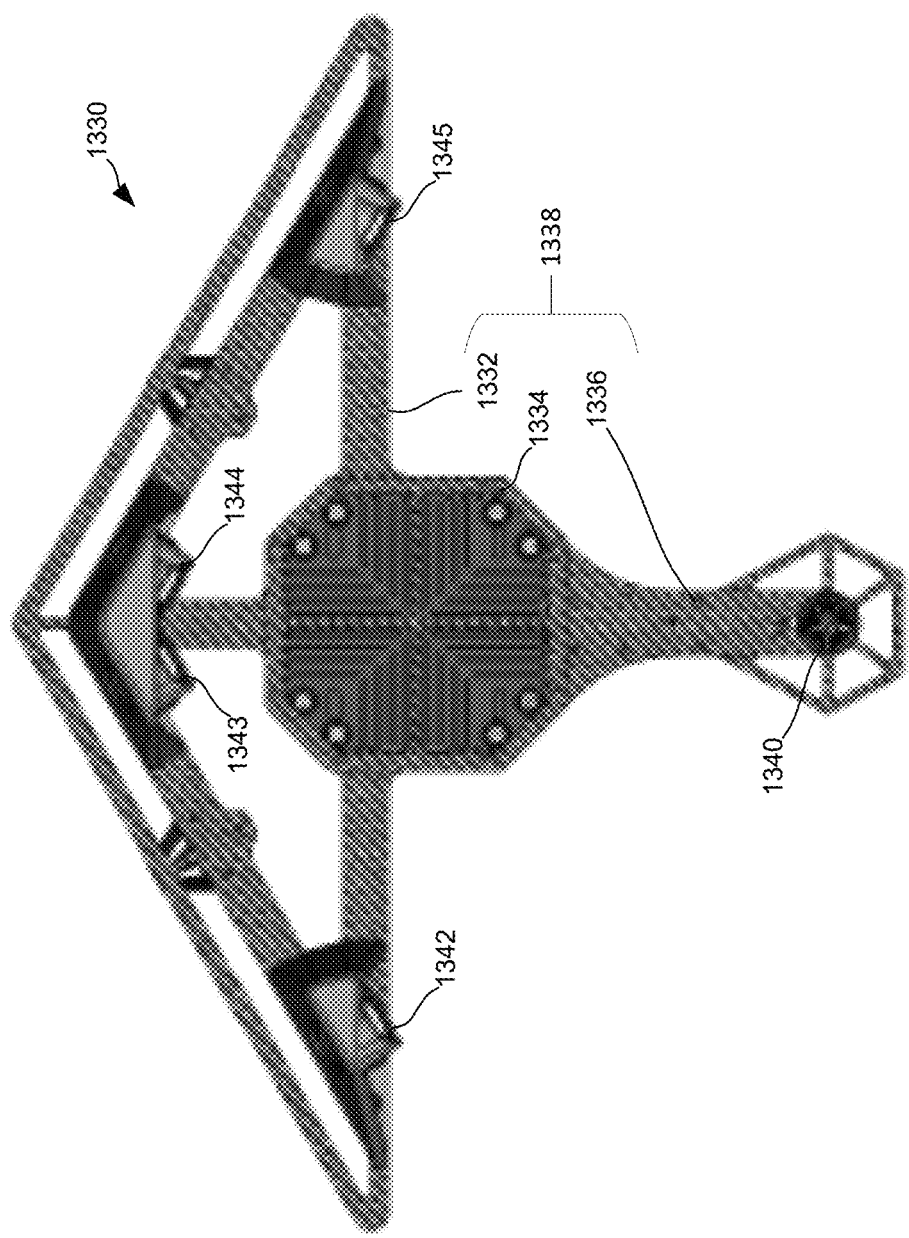
FIGS. 13A-E illustrate an example of an asymmetric quadcopter with two stereoscopic cameras.

FIG. 13A shows another example of a drone 1330 (an asymmetric quadcopter) in top-down perspective, illustrating a triangular portion 1332, central portion 1334, and tail portion 1336 of frame 1338. A tail motor 1340 can be seen attached to tail portion 1336. Other motors (e.g. nose motor, left-side motor, and right-side motor) are not visible in this view because they are under triangular portion 1332 of frame 1338. Camera housings containing cameras are mounted to an upper surface of triangular portion 1332 so that a pair of cameras form a stereoscopic camera on either side of the centerline. A left-side stereoscopic camera is formed by cameras 1342, 1343, and a right-side stereoscopic camera is formed by cameras 1344, 1345. These stereoscopic cameras are directed perpendicular to their respective edges of triangular portion 1332 in this example (camera angles are not necessarily aligned with frame features). Cameras 1324-1345 generally have fields of view that are unobscured by propellers when flying with negative pitch so that the area ahead along the primary direction of travel can be clearly seen by cameras 1324-1345 when flying at speed. Fields of view may be arranged so that there is overlap between fields of view of the left-side and right-side stereoscopic cameras on either side of the centerline.

Figure 13B:
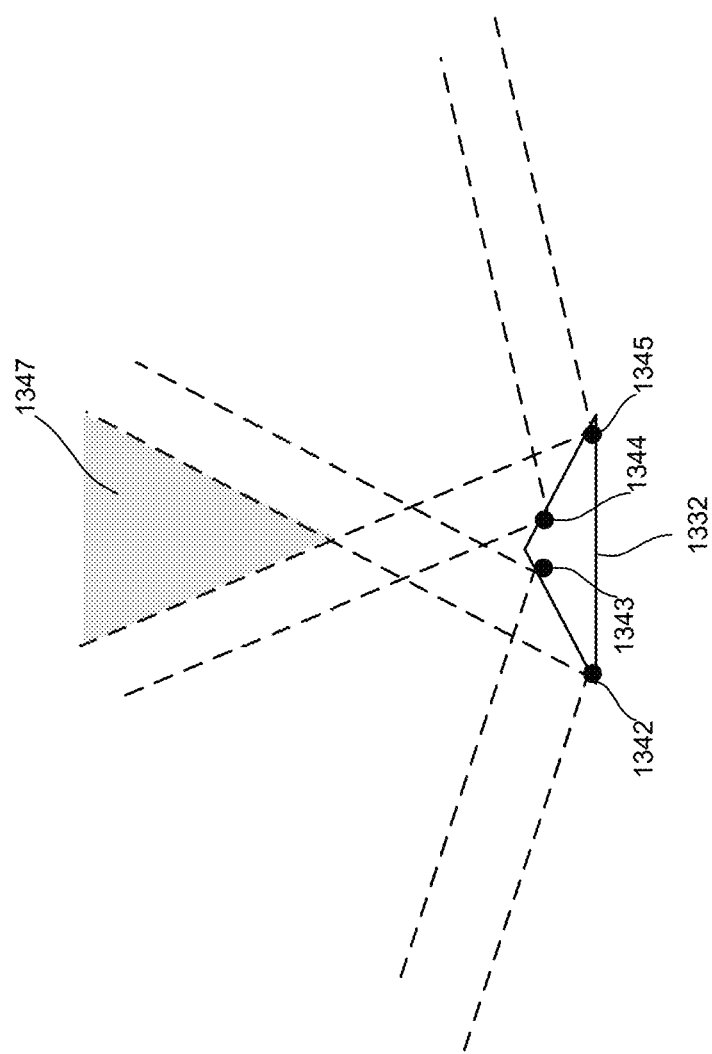

FIG. 13B illustrates fields of view of cameras 1324-1345 (four cameras forming two stereoscopic cameras) attached to triangular portion 1332 to provide a wide frontal field of view that is generally unobstructed by propellers even when flying nose-down. It can be seen that fields of view overlap in area 1347 ahead of triangular portion 1332 so that cameras 1324-1345 all cover area 1347. Thus, area 1347 is covered by the left-side stereoscopic camera formed by cameras 1342, 1343 and by the right-side stereoscopic camera formed by cameras 1344, 1345 so that a stereoscopic video data is available for the pathway ahead even if one stereoscopic camera is obscured, damaged, or otherwise unavailable.

Figure 13C:
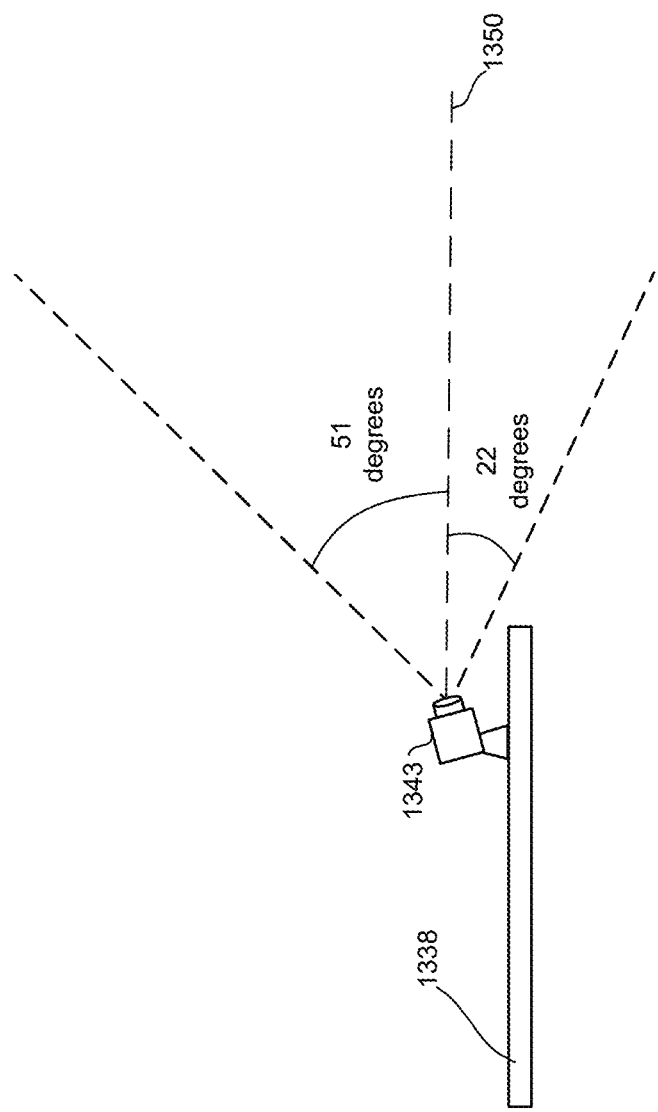

In addition to extending to cover wide angles that overlap ahead of a drone, the fields of view of cameras such as cameras 1324-1345 may cover a wide vertical range. For example, FIG. 13C shows camera 1343 configured to cover a 73-degree angle. The field of view of camera 1343 extends 22 degrees below horizontal line 1350 and extends 51 degrees above horizontal line 1350 in this example. The field of view of such a camera may extend upwards unobstructed by propellers or other obstructions for any suitable angle (e.g. 45 degrees, 70 degrees, or even 90 degrees) so that a clear frontal view is available regardless of any negative pitch. Horizontal line 1350 is a line parallel to the plane of frame 1338 which may be horizontal when drone 1330 is at rest on a horizontal surface. It will be understood that when drone 1330 files, the plane of frame 1338 may not be horizontal (e.g. see FIG. 8B).

Figure 13D:
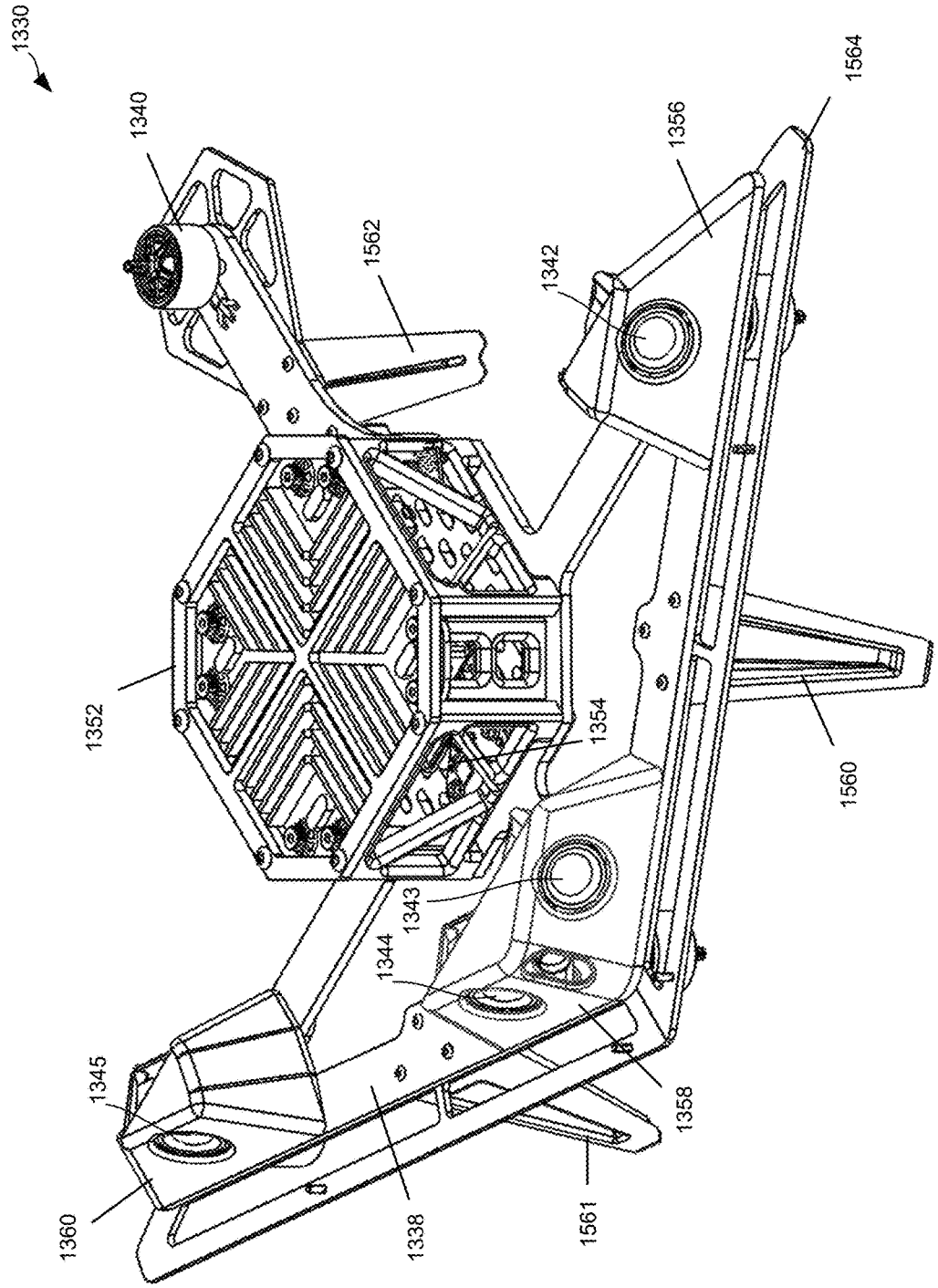

FIG. 13D shows a more detailed view of drone 1330 including frame 1338 and tail motor 1340 in a perspective view from the left side above and ahead of drone 1330. On central portion of frame 1338 a cage 1352 (protective cage) protects various components 1354 that are mounted on the central portion (not visible in this view), which may include one or more batteries, power control circuits, communication circuits, flight control circuits, an AI controller, a heat sink, and other components. Openings in cage 1352 and openings in central portion 1334 allow cooling airflow around such components during flight. Camera 1342 is located in left-side camera housing 1356, cameras 1343, 1344 are located in center camera housing 1358, and camera 1345 is located in right-side camera housing 1360 (only lenses of cameras 1342-1345 are visible because of respective housings in this view). Landing gear includes a left-side front landing gear 1560, right-side front landing gear 1561, and rear landing gear 1562, which may be legs attached to a lower surface of frame 1338 and may extend down to a level sufficient to establish adequate clearance between the propellers and the ground or other landing/takeoff surface (e.g. the landing gear extending down from the frame to a level below the propellers to maintain a separation between the propellers and a landing/takeoff surface).

Figure 13E:
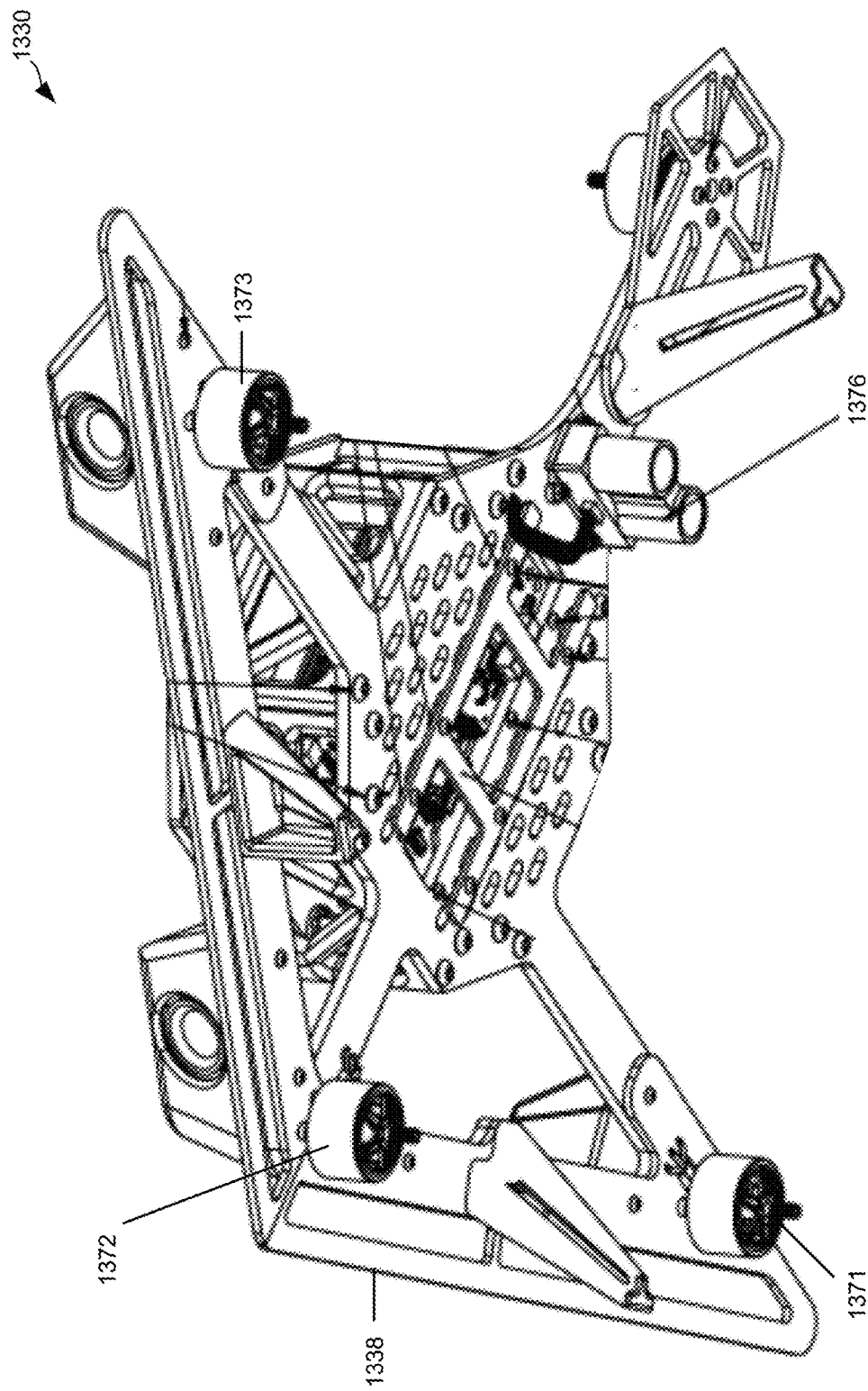

FIG. 13E shows drone 1330 from below left including motors 1371, 1372, 1373 mounted to the lower surface of frame 1338. FIG. 13E also shows a LiDAR device 1376 attached to the lower surface of frame 1338. LiDAR device 1376 may be a rangefinder that is directed downwards to detect height above ground or may be a LiDAR device that returns distance for a wide area so that 3-D information regarding the underlying surface may be provided to an AI controller. Frame 1338 includes openings for cooling air flow.

Figure 14A:
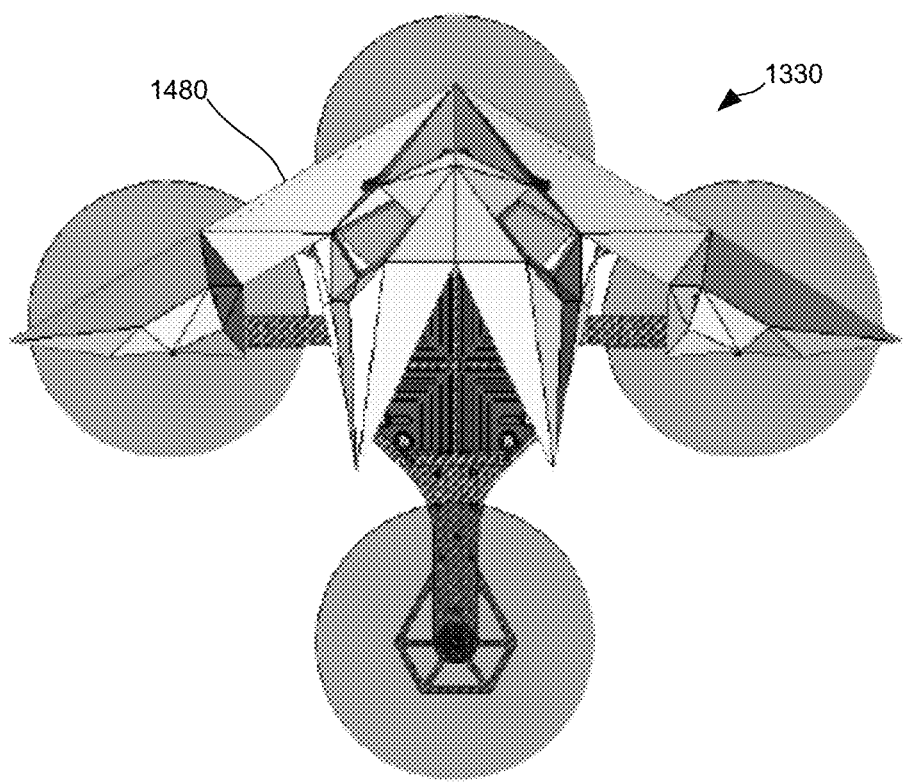
FIGS. 14A-B illustrate an example of a drone with fairing.
Figure 14B:
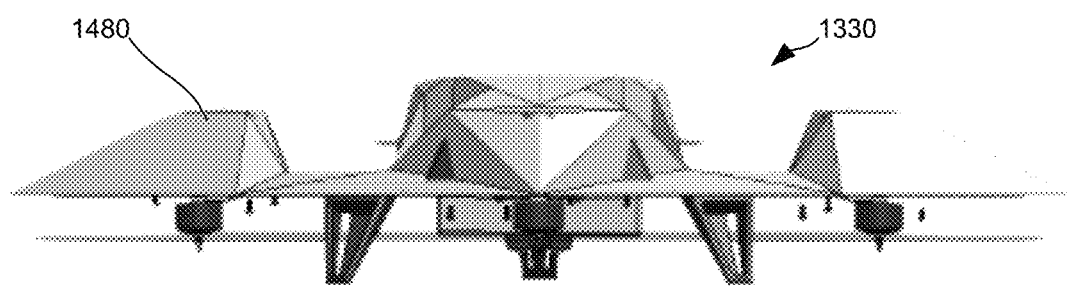

A drone such as drone 1330 may have fairing components added to reduce drag when flying and for aesthetic reasons. FIG. 14A shows an example of drone 1330 with fairing 1480 added to cover the frame and other components, which can reduce drag and provide protection on impact. FIG. 4B shows drone from ahead along the centerline and illustrates the aerodynamic shape provided by fairing 1480.

Figure 15:
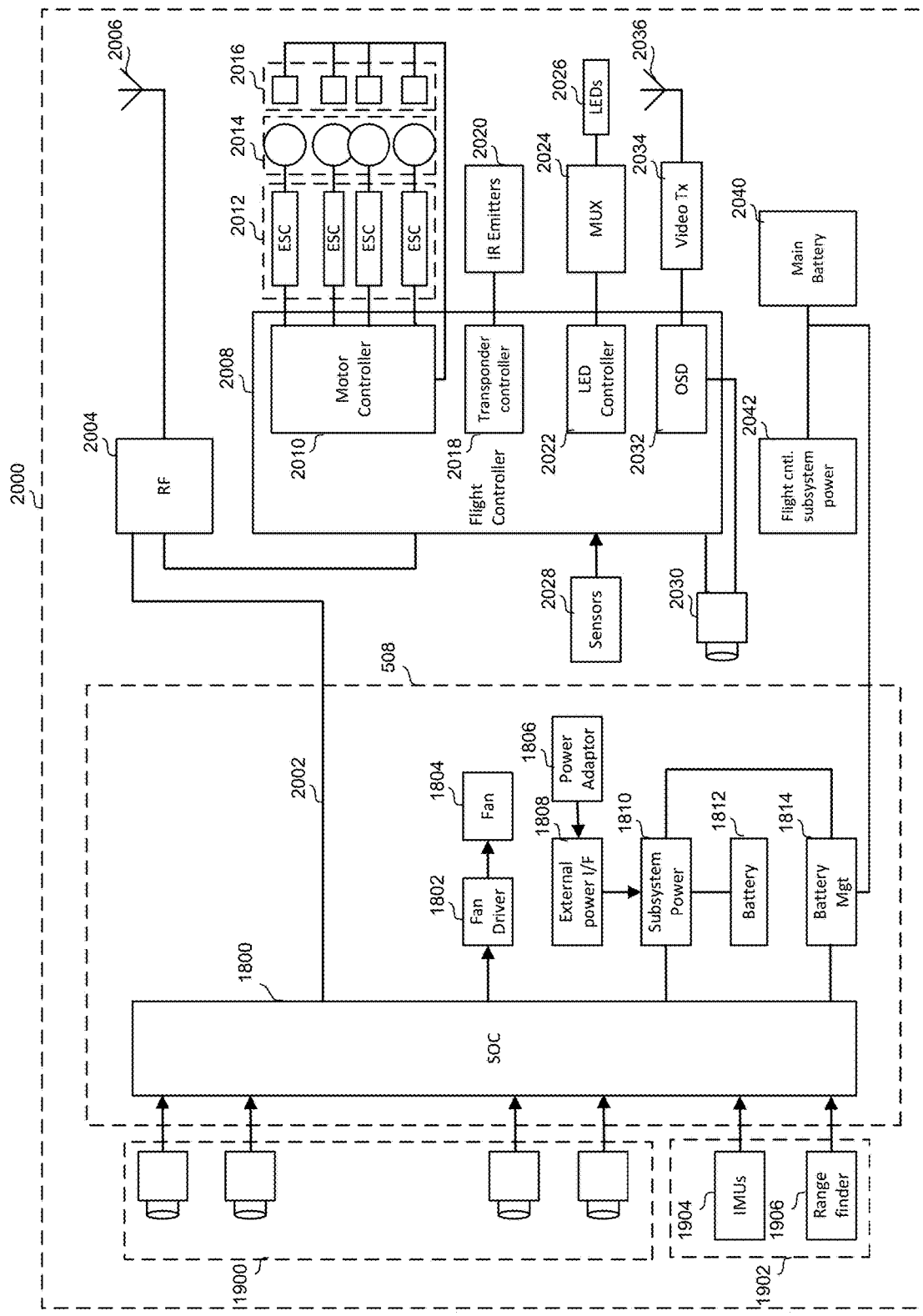
FIG. 15 shows an example of an AI controller in an autonomous drone.

Drones such as drone 1330 may be configured for remote control (e.g. FPV) or, with appropriate control circuits, for autonomous flight, e.g. under control of an AI controller. FIG. 15 shows an example of AI controller 508 in an autonomous drone 2000, which is configured to be piloted by AI controller 508. Autonomous drone 2000 may be considered an example implementation of drone 1330 for autonomous operation (i.e. without requiring a human pilot). Autonomous drone 2000 includes four video cameras 1900 (e.g. configured as two stereoscopic cameras) and sensors 1902 including IMUs 1904 and rangefinder 1906, e.g. LiDAR device 1376. Output 2002 (e.g. SBUS output) from AI controller 508 goes to an RF communications circuit 2004 (control radio module) which is connected to antenna 2006 (which may couple it to a remote unit or remote-control). RF communications circuit 2004 is coupled to flight controller 2008 to send flight control commands to flight controller 2008. Flight control commands may come from AI controller 508 or from a remote unit (via RF communications) according to the same command format so that commands are interchangeable. Thus, when RF communications circuit 2004 receives a command from a remote unit to take over piloting from AI controller 508, RF communications circuit 2004 stops sending the commands from AI controller 508 to flight controller 2008 and instead sends commands from the remote unit. Flight controller 2008 includes various modules including a motor controller 2010 module that controls four Electronic Speed Control (ESC) units 2012 that drive four quadcopter motors 2014 (e.g. motors 1371-1373 and 1340, which are coupled to corresponding fixed-pitch propellers—not shown). Hall effect sensors 2016 monitor quadcopter motors 2014 to provide feedback to motor controller 2010. A transponder controller 2018 controls infrared (IR) emitters 2020 that may be used to monitor a quadcopter as it flies around a racecourse. An LED controller 2022 controls LEDs 2026 (Light Emitting Diodes) through multiplexer 2024 (MUX) which may illuminate autonomous drone 2000. In addition to sensors 1902 coupled to AI controller 508, sensors 2028 may be directly connected to flight controller 2008 and may include one or more IMUs and a barometer (e.g. Bosch BMP280). In addition to cameras 1900 coupled to AI controller 508 for computer vision, autonomous quadcopter 2000 includes camera 2030, which may be used to send video to a remote user for remote-control piloting of autonomous quadcopter 2000 using first-person view (FPV). Output from camera 2030 is sent to On Screen Display unit 2032 and to video transmitter 2034 for transmission to the remote user via antenna 2036. A main battery 2040 provides a principal source of power for flight controller 2008 (including motors 2014) via flight controller subsystem power unit 2042 and, in this example also provides power to battery management unit 1814 of AI controller 508 (e.g. AI controller 508 may be powered from main battery 2040 or from battery 1812).

An autonomous quadcopter such as autonomous quadcopter 2000 of FIG. 15 may be operated so that it flies autonomously using an AI module such as AI controller 508 instead of a human pilot using a remote-control.

An example of a drone includes a frame; a plurality of motors attached to the frame, each motor of the plurality of motors connected to a respective propeller of a plurality of propellers located below the frame; a tail motor attached to the frame, the tail motor connected to a tail propeller located above the frame; and a plurality of cameras attached to the frame and located above the frame, the plurality of cameras having fields of view extending over the plurality of propellers.

The plurality of motors may consist of a nose motor, a left-side motor, and a right-side motor. The tail motor and the nose motor may be located along a centerline of the drone and the left-side motor and the right-side motor may be located closer to the nose motor than to the tail motor and are equidistant from the centerline. The plurality of cameras may include at least a left-side stereoscopic camera mounted on the left side of the drone and a right-side stereoscopic camera mounted on the right side of the drone. The left-side stereoscopic camera may have a field of view ahead and to the left of the drone, the right-side stereoscopic camera may have a field of view ahead and to the right of the drone, and the fields of view of the left-side stereoscopic camera and the right-side stereoscopic camera may overlap ahead of the drone. The drone may include an Artificial Intelligence (AI) controller coupled to the plurality of cameras to receive video input from the plurality of cameras, the AI controller may be configured to generate flight control commands for autonomous flight according to the video input. The drone may include a protective cage attached to an upper side of the frame, the protective cage extending around the AI controller with openings for cooling airflow. The drone may include landing gear attached to the frame, the landing gear extending down from the frame to a level below the propellers to maintain a separation between the propellers and a landing/takeoff surface. The drone may include a LiDAR device attached to a lower surface of the frame, the LiDAR device directed downwards from the drone.

An example of an autonomous quadcopter includes a frame extending along a plane; a nose motor attached to the frame, the nose motor coupled to a nose propeller located below the plane; a left-side motor attached to the frame, the left-side motor coupled to a left-side propeller located below the plane; a right-side motor attached to the frame, the right-side motor coupled to a right-side propeller located below the plane; a tail motor attached to the frame, the tail motor coupled to a tail propeller located above the plane; a plurality of cameras attached to the frame, the plurality of cameras located above the plane; and one or more control circuits configured to receive video signals from the plurality of cameras and to control the nose motor, the left-side motor, the right-side motor, and the tail motor according to the video signals for autonomous flight.

The frame may extend from a nose along a centerline to a tail, the frame may include a triangular nose portion that forms an obtuse angle at the nose, a first acute angle on the left side of the centerline, and a second acute angle on the right side of the centerline, and the nose motor, the left-side motor, and the right-side motor may be attached at respective corners of the triangular nose portion. The frame may include a central portion, the one or more control circuits may be attached to the central portion, a protective cage may extend above the one or more control circuits and the central portion. The frame may include a tail portion, the tail motor may be attached to the tail portion at a distance from the left-side motor and the right-side motor that is greater than the distance from the nose motor to the left-side motor and the right-side motor. The autonomous quadcopter may include a plurality of legs extending down from the frame to a level below the nose propeller, left-side propeller, and right-side propeller. The plurality of cameras may consist of four cameras forming a left-side stereoscopic camera and a right-side stereoscopic camera and fields of view of the left-side stereoscopic camera and the right-side stereoscopic camera may overlap forward of the autonomous quadcopter. The plurality of cameras may have fields of view that extend, unobstructed by propellers, up at least 45 degrees from a plane of the frame. The one or more control circuits may include: a Radio Frequency (RF) communication circuit, the RF communication circuit configured to receive external commands from a remote-control; and an Artificial Intelligence (AI) controller coupled to the plurality of cameras to receive input from the plurality of stereoscopic cameras and determine a flightpath for the autonomous quadcopter according to locations of objects viewed by the stereoscopic cameras. The autonomous quadcopter may further include a LiDAR rangefinder coupled to the AI controller, the LiDAR rangefinder configured to determine distance between an object and the autonomous quadcopter.

An example of an autonomous quadcopter includes: an asymmetric frame extending along a plane, the asymmetric frame including a triangular nose portion bisected by a centerline and a tail portion extending from the triangular nose portion along the centerline; a nose motor located along the centerline at a leading corner of the triangular nose portion, the nose motor coupled to a nose propeller located below the asymmetric frame; a left-side motor located at a left-side corner of the triangular nose portion, the left-side motor coupled to a left-side propeller located below the asymmetric frame; a right-side motor located at a right-side corner of the triangular nose portion, the right-side motor coupled to a right-side propeller located below the asymmetric frame; a tail motor located along the centerline and attached to the tail portion, the tail motor coupled to a tail propeller located above the asymmetric frame; a left-side stereoscopic camera attached to an upper side of the triangular nose portion to the left of the centerline; a right-side stereoscopic camera attached to the upper side of the triangular nose portion to the right of the centerline; and one or more control circuits configured to receive video signals from the left-side stereoscopic camera and the right-side stereoscopic camera and to control the nose motor, the left-side motor, the right-side motor, and the tail motor according to the video signals for autonomous flight.

The autonomous quadcopter may include landing gear extending from a lower surface of the asymmetric frame and extending past the nose propeller, the left-side propeller, and the right-side propeller to maintain clearance between the nose propeller, the left-side propeller, and the right-side propeller, and a landing/takeoff surface.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

The invention claimed is:

1. A drone comprising:
a frame;
a plurality of motors attached to the frame, each motor of the plurality of motors connected to a respective propeller of a plurality of propellers located below the motor and below the frame;
a tail motor attached to the frame, the tail motor connected to a tail propeller located above the frame, the tail propeller and the plurality of propellers having fixed orientations with respect to the frame and with respect to each other;
a plurality of cameras attached to the frame and located above the frame, the plurality of cameras includes at least a left-side stereoscopic camera mounted on the left side of the drone and a right-side stereoscopic camera mounted on the right side of the drone, the plurality of cameras having fields of view extending over the plurality of propellers;
an Artificial Intelligence (AI) controller coupled to the plurality of cameras to receive video input from the plurality of cameras, the AI controller configured to generate flight control commands for autonomous flight according to the video input; and
a protective cage attached to an upper side of the frame, the protective cage extending around the AI controller with openings for cooling airflow.

2. The drone of claim 1 wherein the plurality of motors consists of a nose motor, a left-side motor, and a right-side motor.

3. The drone of claim 2 wherein the tail motor and the nose motor are located along a centerline of the drone and the left-side motor and the right-side motor are located closer to the nose motor than to the tail motor and are equidistant from the centerline.

4. The drone of claim 1 wherein the left-side stereoscopic camera has a field of view ahead and to the left of the drone, the right-side stereoscopic camera has a field of view ahead and to the right of the drone, and the fields of view of the left-side stereoscopic camera and the right-side stereoscopic camera overlap ahead of the drone.

5. The drone of claim 1 further comprising landing gear attached to the frame, the landing gear extending down from the frame to a level below the propellers to maintain a separation between the propellers and a landing/takeoff surface.

6. The drone of claim 1 further comprising a LiDAR device attached to a lower surface of the frame, the LiDAR device directed downwards from the drone.

7. The drone of claim 1 wherein the frame extends from a nose along a centerline to a tail, the frame includes a triangular nose portion that forms an obtuse angle at the nose, a first acute angle on the left side of the centerline, and a second acute angle on the right side of the centerline, and wherein the plurality of motors include a nose motor, a left-side motor, and a right-side motor that are attached at respective corners of the triangular nose portion.

8. The drone of claim 7 wherein the frame includes a central portion, the AI controller attached to the central portion, the protective cage extending above the AI controller and the central portion.

9. The drone of claim 7 wherein the frame includes a tail portion, the tail motor attached to the tail portion at a distance from the left-side motor and the right-side motor that is greater than the distance from the nose motor to the left-side motor and the right-side motor.

10. The drone of claim 1 further including a plurality of legs extending down from the frame to a level below the plurality of propellers.

11. The drone of claim 1 wherein fields of view of the left-side stereoscopic camera and the right-side stereoscopic camera overlap forward of the autonomous quadcopter.

12. The drone of claim 11 wherein the plurality of cameras have fields of view that extend, unobstructed by propellers, up at least 45 degrees from a plane of the frame.

13. The drone of claim 1 further comprising:
a Radio Frequency (RF) communication circuit, the RF communication circuit configured to receive external commands from a remote-control.

14. The drone of claim 1 further comprising a LiDAR rangefinder coupled to the AI controller, the LiDAR rangefinder configured to determine distance between an object and the drone.

15. The drone of claim 1 further comprising landing gear extending from a lower surface of the frame and extending past the plurality of propellers to maintain clearance between the plurality of propellers and a landing/takeoff surface.

* * * * *